United States Patent
Chen et al.

(10) Patent No.: US 11,815,791 B2
(45) Date of Patent: *Nov. 14, 2023

(54) IMAGING LENS ASSEMBLY MODULE, CAMERA MODULE AND ELECTRONIC DEVICE

(71) Applicant: LARGAN PRECISION CO., LTD., Taichung (TW)

(72) Inventors: Kuan-Ming Chen, Taichung (TW); Hsiang-Chi Tang, Taichung (TW); Lin-An Chang, Taichung (TW); Cheng-Chen Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 73 days.

This patent is subject to a terminal disclaimer.

(21) Appl. No.: 17/487,025

(22) Filed: Sep. 28, 2021

(65) Prior Publication Data
US 2022/0011651 A1 Jan. 13, 2022

Related U.S. Application Data

(63) Continuation of application No. 16/851,147, filed on Apr. 17, 2020, now Pat. No. 11,156,903.

(30) Foreign Application Priority Data

Jul. 25, 2019 (TW) .................................. 108126407

(51) Int. Cl.
G03B 17/12 (2021.01)
H04N 23/55 (2023.01)
H04N 23/68 (2023.01)

(52) U.S. Cl.
CPC ............. *G03B 17/12* (2013.01); *H04N 23/55* (2023.01); *H04N 23/687* (2023.01)

(58) Field of Classification Search
USPC .................................. 396/52, 535; 359/535
See application file for complete search history.

(56) References Cited

U.S. PATENT DOCUMENTS 7,528,880 B2  5/2009 Yamaguchi et al.
8,455,810 B2  6/2013 Tomioka et al.
(Continued)

FOREIGN PATENT DOCUMENTS

CN  202057870 U  11/2011
CN  203658652 U  6/2014
(Continued)

*Primary Examiner* — Clayton E. LaBalle
*Assistant Examiner* — Warren K Fenwick
(74) *Attorney, Agent, or Firm* — McClure, Qualey & Rodack, LLP

(57) ABSTRACT

An imaging lens assembly module has an optical axis, and includes a lens barrel and an optical element set. The lens barrel includes an object-side portion, a tubular portion and a tip-end minimal aperture. The object-side portion includes a first assembling surface. The tubular portion includes a plurality of second assembling surfaces. The optical element set includes at least one light blocking sheet and at least one optical lens element. The light blocking sheet includes an object-side surface, an image-side surface and an inner opening surface. The optical lens element includes an optical effective portion and a peripheral portion. The object-side portion of the lens barrel includes a first reversing inclined surface gradually enlarged from the tip-end minimal aperture to the image side of the lens barrel, and the first reversing inclined surface is not contacted with the optical element set.

26 Claims, 27 Drawing Sheets

(56) References Cited

U.S. PATENT DOCUMENTS

| | | | |
|---|---|---|---|
| 9,413,937 B2 | 8/2016 | Lin | |
| 9,678,336 B2 | 6/2017 | Cho et al. | |
| 9,753,243 B2 | 9/2017 | Chou | |
| 9,759,886 B2 | 9/2017 | Wei et al. | |
| 9,904,050 B2 | 2/2018 | Lin et al. | |
| 10,114,192 B2 | 10/2018 | Wei et al. | |
| 10,151,900 B2 | 12/2018 | Lin et al. | |
| 10,281,676 B2 | 5/2019 | Lin et al. | |
| 11,156,903 B2 * | 10/2021 | Chen | H04N 23/687 |
| 2017/0139172 A1 | 5/2017 | Wei et al. | |
| 2017/0139174 A1 | 5/2017 | Wei et al. | |
| 2017/0139175 A1 | 5/2017 | Wei et al. | |
| 2017/0139176 A1 | 5/2017 | Wei et al. | |
| 2017/0139177 A1 | 5/2017 | Wei et al. | |
| 2019/0020795 A1 | 1/2019 | Tian | |
| 2020/0409028 A1 * | 12/2020 | Tsai | G02B 7/04 |

FOREIGN PATENT DOCUMENTS

| | | |
|---|---|---|
| CN | 204758902 U | 11/2015 |
| CN | 205103485 U | 3/2016 |
| CN | 205507179 U | 8/2016 |
| CN | 205899059 U | 1/2017 |
| CN | 205899116 U | 1/2017 |
| CN | 206523684 U | 9/2017 |

* cited by examiner

IMAGING LENS ASSEMBLY MODULE, CAMERA MODULE AND ELECTRONIC DEVICE

RELATED APPLICATIONS

This application is a continuation of U.S. application Ser. No. 16/851,147, filed Apr. 17, 2020, now U.S. Pat. No. 11,156,903 which claims priority to Taiwan Application Serial Number 108126407, filed Jul. 25, 2019, which is herein incorporated by reference.

BACKGROUND

Technical Field

The present disclosure relates to an imaging lens assembly module and a camera module. More particularly, the present disclosure relates to an imaging lens assembly module and a camera module applicable to a portable electronic device.

Description of Related Art

In recent years, portable electronic devices have developed rapidly. For example, intelligent electronic devices and tablets have been filled in the lives of modern people, and camera modules mounted on portable electronic devices have also prospered. However, as technology advances, the quality requirements of camera modules are becoming higher and higher. Therefore, in addition to the achievement of the miniaturization of camera modules, the imaging quality of the imaging lens assembly module needs to be improved.

SUMMARY

According to one aspect of the present disclosure, an imaging lens assembly module has an optical axis, and includes a lens barrel and an optical element set, wherein optical element set is disposed in the lens barrel. The lens barrel includes an object-side portion, a tubular portion and a tip-end minimal aperture. The object-side portion surrounds the optical axis, includes a first assembling surface, and the first assembling surface faces toward an image side of the lens barrel. The tubular portion surrounds the optical axis, the tubular portion is connected to the object-side portion and extends to the image side of the lens barrel, and includes a plurality of second assembling surfaces, wherein all of the second assembling surfaces face toward the optical axis, the second assembling surfaces are arranged from an object side of the lens barrel to the image side of the lens barrel in order, and have different diameters. The tip-end minimal aperture is a symmetrical circle about the optical axis as a center, and the tip-end minimal aperture is located on the object-side portion. The optical element set includes at least one light blocking sheet and at least one optical lens element. The light blocking sheet includes an object-side surface, an image-side surface and an inner opening surface. The object-side surface is disposed on the first assembling surface. The inner opening surface is connected to the object-side surface and the image-side surface, and is corresponding to the tip-end minimal aperture. The optical lens element, in order from the optical axis to a peripheral region of the optical lens element, includes an optical effective portion and a peripheral portion. The peripheral portion surrounds the optical effective portion, and is disposed on one of the second assembling surfaces. The object-side portion of the lens barrel includes a first reversing inclined surface gradually enlarged from the tip-end minimal aperture to the image side of the lens barrel, and the first reversing inclined surface is not contacted with the optical element set. When an axial distance between the tip-end minimal aperture and the first assembling surface is Da, the following condition is satisfied: 0.25 mm<Da<1.4 mm.

According to one aspect of the present disclosure, a camera module includes the imaging lens assembly module of the aforementioned aspect and an image sensor module. The imaging lens assembly module is disposed on the image sensor module, and the image sensor module includes an image sensor.

According to one aspect of the present disclosure, an electronic device includes the camera module of the aforementioned aspect.

According to one aspect of the present disclosure, an imaging lens assembly module has an optical axis, and includes a transparent flat plate, a lens barrel, an optical element set and an aperture element. The lens barrel is disposed on an image side of the transparent flat plate, and includes an object-side portion, a tubular portion and a tip-end minimal aperture. The object-side portion surrounds the optical axis, includes a first assembling surface, and the first assembling surface faces toward an image side of the lens barrel. The tubular portion surrounds the optical axis, the tubular portion is connected to the object-side portion and extends to the image side of the lens barrel, and includes a plurality of second assembling surfaces, wherein all of the second assembling surfaces face toward the optical axis, the second assembling surfaces are arranged from an object side of the lens barrel to the image side of the lens barrel in order, and have different diameters. The tip-end minimal aperture is a symmetrical circle about the optical axis as a center, and the tip-end minimal aperture is located on the object-side portion. The optical element set is disposed in the lens barrel, and includes a plurality of light blocking sheets and at least one optical lens element. Each of the light blocking elements has an opening surrounding the optical axis, and the light blocking elements include at least one light blocking sheet. The light blocking sheet includes an object-side surface, an image-side surface and an inner opening surface. The object-side surface is disposed on the first assembling surface. The inner opening surface is connected to the object-side surface and the image-side surface, and is corresponding to the tip-end minimal aperture. The optical lens element, in order from the optical axis to a peripheral region of the optical lens element, includes an optical effective portion and a peripheral portion. The peripheral portion surrounds the optical effective portion, and is disposed on one of the second assembling surfaces. The aperture element includes an aperture opening surrounding the optical axis, and the aperture element is disposed between the transparent flat plate and the first assembling surface. When an opening diameter of the aperture opening is φg, and a minimum opening diameter of a minimum opening among the tip-end minimal aperture of the lens barrel and the openings of the light blocking elements is φmin, the following condition is satisfied: 0.9<φg/φmin<1.4.

According to one aspect of the present disclosure, a camera module includes the imaging lens assembly module of the aforementioned aspect and an image sensor module. The imaging lens assembly module is disposed on the image sensor module, and the image sensor module includes an image sensor.

According to one aspect of the present disclosure, an electronic device includes the camera module of the aforementioned aspect.

According to one aspect of the present disclosure, an imaging lens assembly module has an optical axis, and includes a transparent flat plate, a lens barrel and an optical element set. The lens barrel is disposed on an image side of the transparent flat plate, and includes an object-side portion, a tubular portion and a tip-end minimal aperture. The object-side portion surrounds the optical axis, includes a first assembling surface, and the first assembling surface faces toward an image side of the lens barrel. The tubular portion surrounds the optical axis, the tubular portion is connected to the object-side portion and extends to the image side of the lens barrel, and includes a plurality of second assembling surfaces, wherein all of the second assembling surfaces face toward the optical axis, the second assembling surfaces are arranged from an object side of the lens barrel to the image side of the lens barrel in order, and have different diameters. The tip-end minimal aperture is a symmetrical circle about the optical axis as a center, and the tip-end minimal aperture is located on the object-side portion. The optical element set is disposed in the lens barrel, and includes a plurality of light blocking sheets and at least one optical lens element. Each of the light blocking elements has an opening surrounding the optical axis. The optical lens element is disposed on one of the second assembling surfaces. The imaging lens assembly module includes an aperture stop disposed between the first assembling surface and the transparent flat plate, and an opening diameter of the aperture stop is an entrance pupil diameter of the imaging lens assembly module. A minimum opening among the tip-end minimal aperture of the lens barrel and the openings of the light blocking elements is located on an image side of the aperture stop. When an opening diameter of the aperture stop is $\varphi s$, a minimum opening diameter of the minimum opening among the tip-end minimal aperture of the lens barrel and the openings of the light blocking elements is $\varphi min$, and an axial distance between the aperture stop and the first assembling surface is Ds, the following conditions are satisfied: $0.9 < \varphi s/\varphi min < 1.4$, and $0.9 < \varphi s/\varphi min < 1.4$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
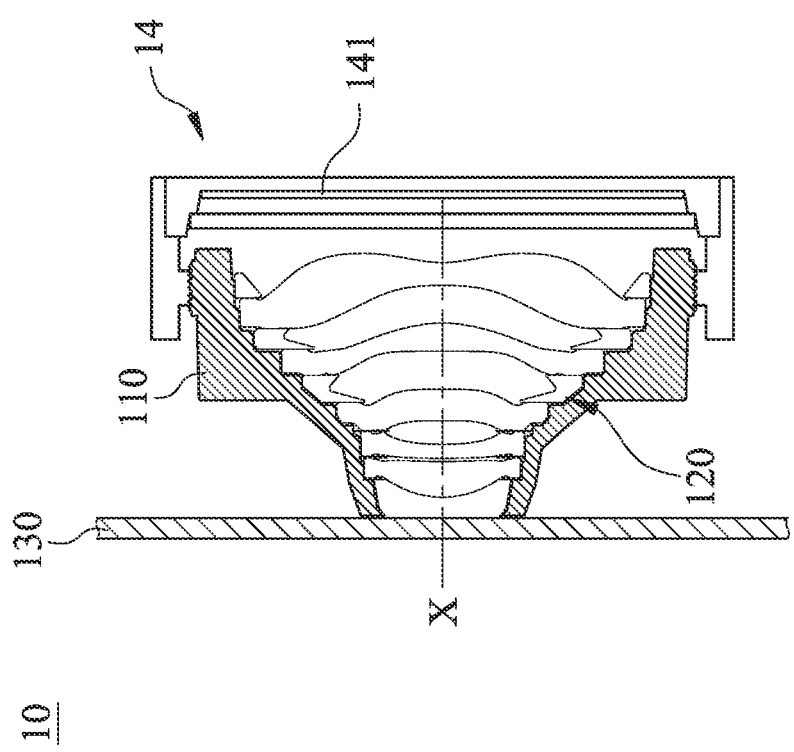
FIG. 1A is a schematic view of a camera module according to the 1st embodiment of the present disclosure.

The present disclosure provides an imaging lens assembly module. The imaging lens assembly module has an optical axis, and includes a lens barrel and an optical element set. The optical element set is disposed in the lens barrel. The lens barrel includes an object-side portion, a tubular portion and a tip-end minimal aperture. The object-side portion and the tubular portion surround the optical axis. The tubular portion is connected to the object-side portion and extends to an image side of the lens barrel. The tip-end minimal aperture is a symmetrical circle about the optical axis as a center, and the tip-end minimal aperture is located on the object-side portion. The object-side portion includes a first assembling surface, wherein the first assembling surface faces toward an image side of the lens barrel. The tubular portion includes a plurality of second assembling surfaces, wherein all of the second assembling surfaces face toward the optical axis, all of the second assembling surfaces are arranged in order from an object side of the lens barrel to the image side of the lens barrel, and all of the second assembling surfaces have different diameters. The optical element set includes at least one light blocking element and at least one optical lens element, and the light blocking element can be a light blocking sheet. The optical lens element is disposed on the second assembling surfaces, the light blocking element has an opening surrounding the optical axis, and the light blocking element can be disposed on the first assembling surface. Therefore, it is favorable for decreasing a condition of a non-imaging light reflecting in the imaging lens assembling module.

The imaging lens assembly module further includes a transparent flat plate and an aperture element. The transparent flat plate is disposed on an object side of the image lens assembly module. An axial distance between transparent flat plate and the tip-end minimal aperture is smaller than an axial distance between the tip-end minimal aperture and first assembling surface. The aperture element is disposed between the transparent flat plate and the first assembling surface. Furthermore, the lens barrel is disposed on an image side of the transparent flat plate. The aperture element includes an aperture opening surrounding the optical axis. The transparent flat plate can be a glass substrate, a display panel or a protecting board, but is not limited thereto. Therefore, a possibility of manufacturing a lens assembly under display is provided via the present disclosure.

The aperture element can be contacted with the transparent flat plate, the aperture element is located on the image side of the transparent flat plate, and the aperture element can be a light blocking coating, the light blocking sheet or a spacer, but is not limited thereto. Therefore, it is favorable for decreasing a stray light from large angle of the transparent flat plate passing into the lens barrel, and maintaining a stability of assembling the imaging lens assembly module. Also, the disposition of the aperture element is favorable for obtaining a compact size of the imaging lens assembly module.

The object-side portion of the lens barrel further includes a first reversing inclined surface, wherein the first reversing inclined surface is gradually enlarged from the tip-end minimal aperture to the image side of the lens barrel, and the first reversing inclined surface is not contacted with the optical element set. Therefore, a draft angle of injection molding can be provided, and an effect of decreasing a formation of the stray light can be maintained.

The imaging lens assembly module further includes an aperture stop disposed between the first assembling surface and the transparent flat plate, and an opening diameter of the aperture stop is an entrance pupil diameter of the imaging lens assembly module. Furthermore, the tip-end minimal aperture of the lens barrel or the aperture opening of the aperture element can be the aperture stop of the imaging lens assembly module, wherein the tip-end minimal aperture of the lens barrel or the aperture opening of the aperture element is for passing an imaging light. Therefore, the tip-end minimal aperture or the aperture opening being the aperture stop of the imaging lens assembly module is for controlling the amount of incoming light of the imaging lens assembly module, and the opening diameter of the tip-end minimal aperture or the aperture opening being the aperture stop of the imaging lens assembly module is the entrance pupil diameter of the imaging lens assembly module. Also, it is favorable for obtaining the compact size of the imaging lens assembly module. The aperture stop is contacted with the transparent flat plate, that is, the axial distance between the transparent flat plate and the aperture stop is zero, and the tip-end minimal aperture or the aperture opening being the aperture stop of the imaging lens assembly module is disposed on the image side of the transparent flat plate. Therefore, it is favorable for preventing the stray light from large angle of the transparent flat plate passing into the lens barrel and maintaining the stability of assembling the imaging lens assembly module.

A number of the light blocking element of the optical element set can be one or plurality. In detail, the light blocking element includes at least one light blocking sheet. The light blocking sheet includes an object-side surface, an image-side surface and an inner opening surface, wherein the object-side surface is disposed on the first assembling surface, the inner opening surface is connected to the object-side surface and the image-side surface, and the inner opening surface is corresponding to the tip-end minimal aperture. Furthermore, the inner opening can be a conical surface, and be gradually enlarged from an image side of the optical element set to an object side of the optical element set. The light blocking sheet can further include a matt film layer, and the matt film layer is disposed on at least one portion of the object-side surface and the inner opening surface of the light blocking sheet, wherein the matt film layer can be an anti-reflection film or a black ink, but is not limited thereof. The light blocking elements can further include at least one spacer and a retainer.

A minimum opening between the tip-end minimal aperture of the lens barrel and the opening of the light blocking element is located on an image side of the aperture stop.

The optical lens element, in order from the optical axis to a peripheral region, includes an optical effective portion and a peripheral portion, wherein the peripheral portion surrounds the optical effective portion, and the peripheral portion is disposed on one of the second assembling surfaces. Furthermore, the first assembling surface and the second assembling surfaces are used to assemble, and the first assembling surface and the second assembling surfaces are contacted with the optical element set.

The object-side portion can further include a second reversing inclined surface and an object-side outer surface, wherein the second reversing inclined surface is gradually enlarged from the tip-end minimal aperture to the image side of the lens barrel. An angle between the second reversing inclined surface and the optical axis is smaller than an angle between the first reversing inclined surface and the optical axis, and the tip-end minimal aperture, the first reversing inclined surface and the second reversing inclined surface are arranged in order from the object side of the lens barrel to the image side of the lens barrel. The object-side outer surface faces toward the object side of the lens barrel, and the object-side outer surface and the transparent flat plate are connected to each other, wherein the object-side outer surface and an image side of the transparent flat plate are located on a same surface. Therefore, it is favorable for decreasing the stray light from large angle of the transparent flat plate passing into the lens barrel.

The first reversing inclined surface includes a plurality of first grooving structures, and the first grooving structures extend along a direction away from the tip-end minimal aperture, or extend from the object side of the lens barrel to the image side of the lens barrel. Therefore, it is favorable for decreasing a possibility of forming the stray light. The second reversing inclined surface includes a plurality of second grooving structures, and the second grooving structures extend along the direction away from the tip-end minimal aperture. Therefore, the draft angle of injection molding can be provided. The object-side outer surface includes a plurality of third grooving structures, and the third grooving structures extend along the direction away from the tip-end minimal aperture, wherein the third grooving structures are recessed from the reference surface to an inside of the lens barrel. Hence, the object-side outer surface is connected to the transparent flat plate, and the third grooving structures can be not contacted with the transparent flat plate. Therefore, the possibility of the non-imaging light irradiating to the imaging lens assembly module can be decreased via a disposition of the third grooving structures close to the aperture stop of the imaging lens assembly module. The first grooving structures, the second grooving structures and the third grooving structures are regularly disposed along a circular direction of the optical axis. Therefore, the possibility of decreasing the possibility of the stray light.

When a number of the first grooving structures is N1, the following condition can be satisfied: 60<N1<480. Therefore, a structural density can be provided.

When a number of the second grooving structures is N2, the following condition can be satisfied: 60<N2<480. Therefore, the structural density can be provided. Furthermore, the following condition can be satisfied: 60<N2<240. Therefore, a better range of structural integrity of injection molding can be provided.

When a number of the third grooving structures is N3, the following condition can be satisfied: 60<N3<360. Therefore, the structural density can be provided.

Moreover, the number of the first grooving structures and the number of the second grooving structures can be different. Therefore, it is favorable for providing the structural complexity and a manufacturability of molding process.

When an axial distance between the tip-end minimal aperture and the first assembling surface is Da, the following condition can be satisfied: 0.25 mm<Da<1.4 mm. Therefore, it is favorable for the compact size of the imaging lens assembly module. Furthermore, the following condition can be satisfied: 0.4 mm<Da<1.0 mm.

When a maximum outer diameter of the object-side outer surface is φo, the following condition can be satisfied: 1.0 mm<φo<3.5 mm. Therefore, the maximum outer diameter of the object-side outer surface can be controlled in a suitable range, and it is favorable for maintaining a dimensional stability and a manufacturing quality of the tip-end minimal aperture of the lens barrel.

When an opening diameter of the tip-end minimal aperture is φBmin, and a diameter of one of the second assembling surfaces closest to the object side of the lens barrel is φd, the following condition can be satisfied: 0.6<φBmin/φd<1.0. Therefore, the lens barrel can be manufactured via the injection molding and the better quality can be maintained at the condition of the compact size of the imaging lens assembly module.

When an opening diameter of the aperture opening is φg, and a minimum opening diameter of a minimum opening among the tip-end minimal aperture of the lens barrel and the openings of the light blocking elements is φmin, the following condition can be satisfied: 0.9<φg/φmin<1.4. Therefore, it is favorable for obtaining better optical specification. Furthermore, the following condition can be satisfied: 0.92<φg/φmin<1.36. Therefore, it is favorable for obtaining much better optical specification.

When an opening diameter of the aperture stop is φs, and the minimum opening diameter of the minimum opening among the tip-end minimal aperture of the lens barrel and the openings of the light blocking elements is φmin, the following condition can be satisfied: 0.9<φs/φmin<1.4. Therefore, it is favorable for obtaining better optical specification. Furthermore, the following condition can be satisfied: 0.92<φs/φmin<1.36. Therefore, it is favorable for obtaining much better optical specification. Furthermore, the following condition can be satisfied: 0.98≤φs/φmin<1.32. Therefore, it is favorable for obtaining much better optical specification.

When an axial distance between the aperture stop and the first assembling surface is Ds, the following condition can be satisfied: 0.25 mm<Ds<1.4 mm. Therefore, it is favorable for obtaining the compact size of the imaging lens assembly module. Furthermore, the following condition can be satisfied: 0.4 mm<Ds<1.0 mm.

Each of the aforementioned features of the imaging lens assembly module can be utilized in various combinations for achieving the corresponding effects.

The present disclosure provides a camera module, which includes the aforementioned imaging lens assembly module and an image sensor module, wherein the imaging lens assembly module is disposed on the image sensor module, and the image sensor module includes an image sensor. The camera module can be a fixed-focus camera module.

The present disclosure provides an electronic device, which includes the aforementioned camera module. Therefore, it is favorable for promoting the image quality.

According to the aforementioned embodiment, specific embodiments are provided, and illustrated via figures.

1st Embodiment

Figure 1B:
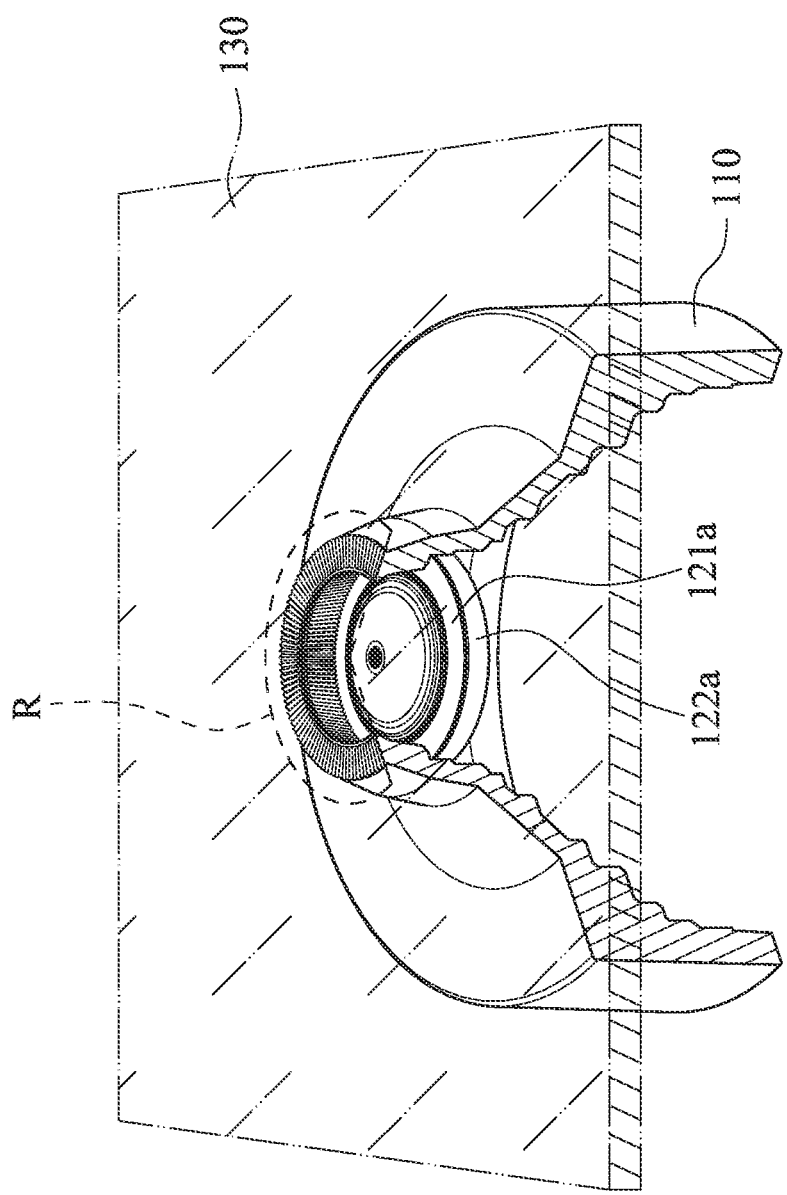
FIG. 1B is a schematic view of a lens barrel and a transparent flat plate of an imaging lens assembly module according to the 1st embodiment in FIG. 1A.

FIG. 1A is a schematic view of a camera module 10 according to the 1st embodiment of the present disclosure. FIG. 1B is a schematic view of a lens barrel 110 and a transparent flat plate 130 of an imaging lens assembly module according to the 1st embodiment in FIG. 1A. In FIGS. 1A and 1B, the camera module 10 includes an imaging lens assembly module (its reference numeral is omitted) and an image sensor module 14. The imaging lens assembly module has an optical axis X, and includes a lens barrel 110, an optical element set 120 and a transparent flat plate 130. The image sensor module 14 includes an image sensor 141. In detail, the transparent flat plate 130 is located on an object side of the imaging lens assembly module. The imaging lens assembly module is disposed on the image sensor module 14, and the imaging lens assembly module can be connected to the image sensor module 14 via the lens barrel 110. The image sensor 141 of the image sensor module 14 is located on an image side of the imaging lens assembly module. The lens barrel 110 of the imaging lens assembly module is disposed on an image side of the transparent flat plate 130, and the optical element set 120 is disposed in the lens barrel 110.

Figure 1C:
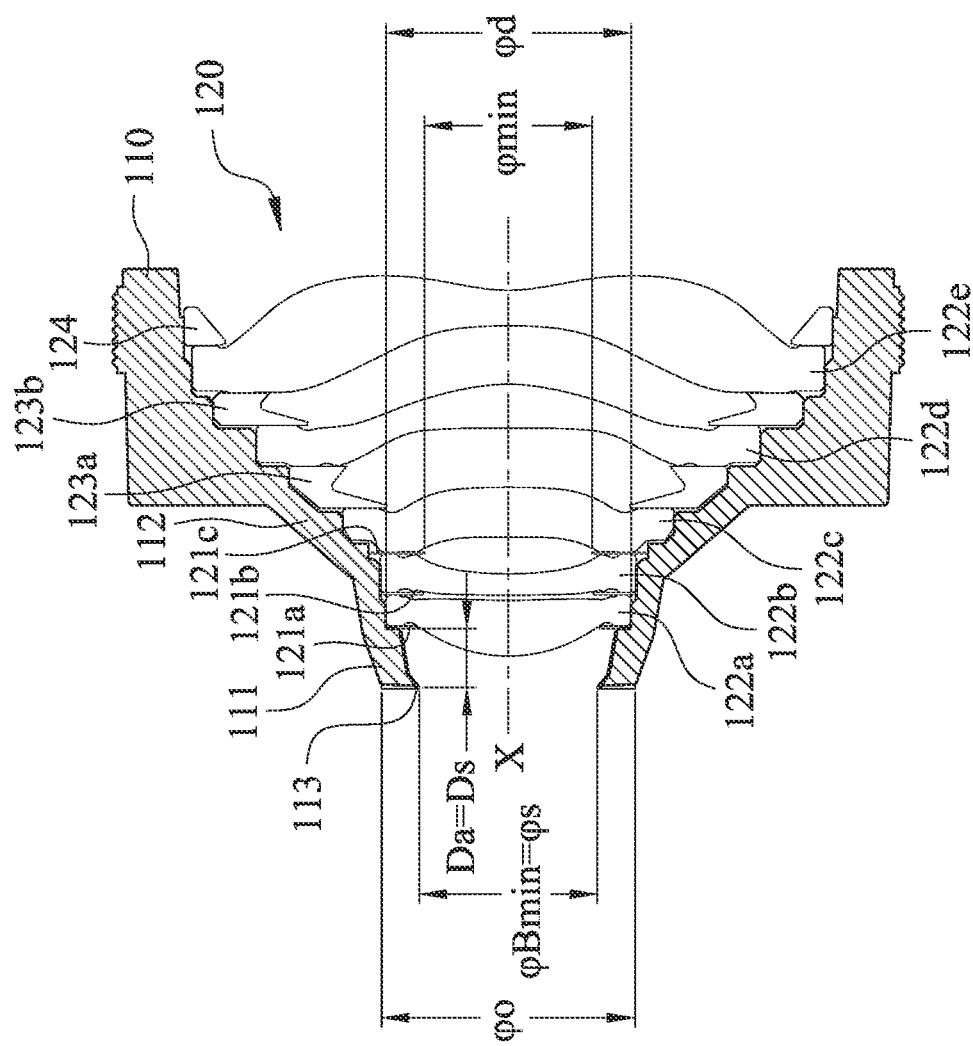
FIG. 1C is a schematic view of the imaging lens assembly module according to the 1st embodiment in FIG. 1A.

FIG. 1C is a schematic view of the imaging lens assembly module according to the 1st embodiment in FIG. 1A. In FIG. 1C, the lens barrel 110 includes an object-side portion 111, a tubular portion 112 and a tip-end minimal aperture 113. Both of the object-side portion 111 and the tubular portion 112 surround the optical axis X. The tubular portion 112 is connected to the object-side portion 111, and extends to the image side of the lens barrel 110. The tip-end minimal aperture 113 is symmetrical about the optical axis X as a center, and the tip-end minimal aperture 113 is located on the object-side portion 111.

According to the 1st embodiment, the tip-end minimal aperture 113 of the lens barrel 110 is an aperture stop of the imaging lens assembly module for passing an imaging light and controlling the amount of incoming light of the imaging lens assembly module, and an opening diameter of the tip-end minimal aperture 113 is an entrance pupil diameter of the imaging lens assembly module. Therefore, the reflection condition of non-imaging light can be decreased by the arrangement of the front aperture, and it is favorable for obtaining the compact size of the imaging lens assembly module.

The optical element set 120 includes at least one light blocking sheet and at least one optical lens element, and the optical element set 120 can further include a plurality of spacers and a retainer. In detail, according to the 1st embodiment, the optical element set 120, in order from an object side to an image side, includes a light blocking sheet 121a, a first optical lens element 122a, a light blocking sheet 121b, a second optical lens element 122b, a light blocking sheet 121c, a third optical lens element 122c, a spacer 123a, a fourth optical lens element 122d, a spacer 123b, a fifth optical lens element 122e and a retainer 124.

Figure 1D:
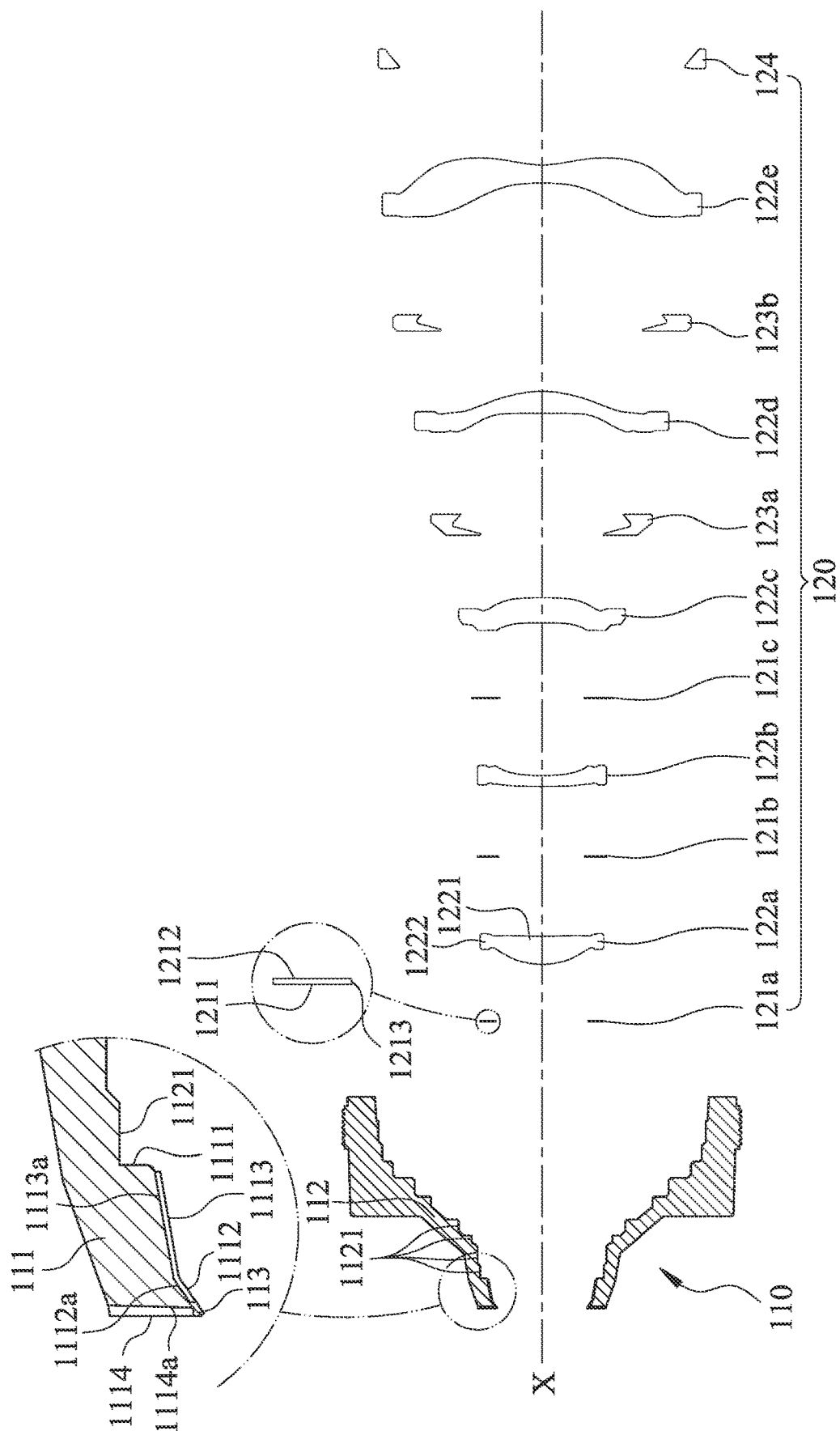
FIG. 1D is an exploded view of the imaging lens assembly module according to the 1st embodiment in FIG. 1A.

FIG. 1D is an exploded view of the imaging lens assembly module according to the 1st embodiment in FIG. 1A. The object-side portion 111 includes a first assembling surface 1111, a first reversing inclined surface 1112, a second reversing inclined surface 1113 and an object-side outer surface 1114. The first assembling surface 1111 faces toward the image side of the lens barrel 110. The first reversing inclined surface 1112 is gradually enlarged from the tip-end minimal aperture 113 to the image side of the lens barrel 110. That is, a diameter of the first reversing inclined surface 1112 is gradually increased from the tip-end minimal aperture 113 to the image side of the lens barrel 110, and the first reversing inclined surface 1112 is not contacted with the optical element set 120 (that is, the first reversing inclined surface 1112 is not directly contacted with the optical element set 120). The second reversing inclined surface 1113 is gradually enlarged from the tip-end minimal aperture 113 to the image side of the lens barrel 110. That is, a diameter of the second reversing inclined surface 1113 is gradually increased from the tip-end minimal aperture 113 to the image side of the lens barrel 110, and an angle between the second reversing inclined surface 1113 and the optical axis X is smaller than an angle between the first reversing inclined surface 1112 and the optical axis X. The tubular portion 112 includes a plurality of second assembling surfaces 1121, wherein all of the second assembling surfaces 1121 face toward the optical axis X, and the second assembling surfaces 1121 are arranged in order from an object side of the lens barrel 110 to the image side of the lens barrel 110, and have different diameters.

The light blocking sheet 121a includes an object-side surface 1211, an image-side surface 1212 and an inner opening surface 1213, wherein the object-side surface 1211 is disposed on the first assembling surface 1111, and the inner opening surface 1213 is connected to the object-side surface 1211 and the image-side surface 1212 and corresponding to the tip-end minimal aperture 113. The first optical lens element 122a, in order from the optical axis X to a peripheral region of the first optical lens element 122a, includes an optical effective portion 1221 and a peripheral portion 1222. The peripheral portion 1222 surrounds the optical effective portion 1221, and is disposed on one of the second assembling surfaces 1121. According to the 1st embodiment, it should be mentioned that each light blocking sheet (includes the light blocking sheets 121b, 121c) of the optical element set 120 includes the object-side surface, the image-side surface and the inner opening surface, and the disposition thereof is the same as the light blocking sheet 121a. Also, each optical lens element (includes the second lens element 122b, the third lens element 122c, the fourth lens element 122d, the fifth lens element 122e) includes the optical effective portion and the peripheral portion, and the disposition thereof is the same as the first lens element 122a. Hence, only the light blocking sheet 121a and the first optical lens element 122a are described herein.

Moreover, the tip-end minimal aperture 113, the first reversing inclined surface 1112 and the second reversing inclined surface 1113 are arranged in order from the object side of the lens barrel 110 to the image side of the lens barrel 110. Therefore, a draft angle of injection molding can be provided, and an effect of decreasing a formation of the stray light can be kept.

In FIG. 1B, the object-side outer surface 1114 faces toward the object side of the lens barrel 110, and the object-side outer surface 1114 and the transparent flat plate 130 are connected to each other. That is, the object-side outer surface 1114 and an image side of the transparent flat plate 130 are located on a same surface. Therefore, it is favorable for preventing the stray light from large angle of the transparent flat plate 130 passing into the lens barrel 110. In detail, an axial distance between the transparent flat plate 130 and the tip-end minimal aperture 113 is smaller than an axial distance between the tip-end minimal aperture 113 and the first assembling surface 1111. The transparent flat plate 130 can be a glass substrate, a display panel or a protecting board, but is not limited thereto. Therefore, according to the 1st embodiment, a manufacturability of a lens assembly under display is provided. Furthermore, according to the 1st embodiment, the axial distance between the transparent flat plate 130 and the aperture stop is between 0.002 mm to 0.03 mm, and the axial distance between the transparent flat plate 130 and the aperture stop can be zero in the case of allowable technical capability, that is, the aperture stop is contacted with the transparent flat plate 130 (that is, the aperture stop is directly contacted with the transparent flat plate 130).

Figure 1E:
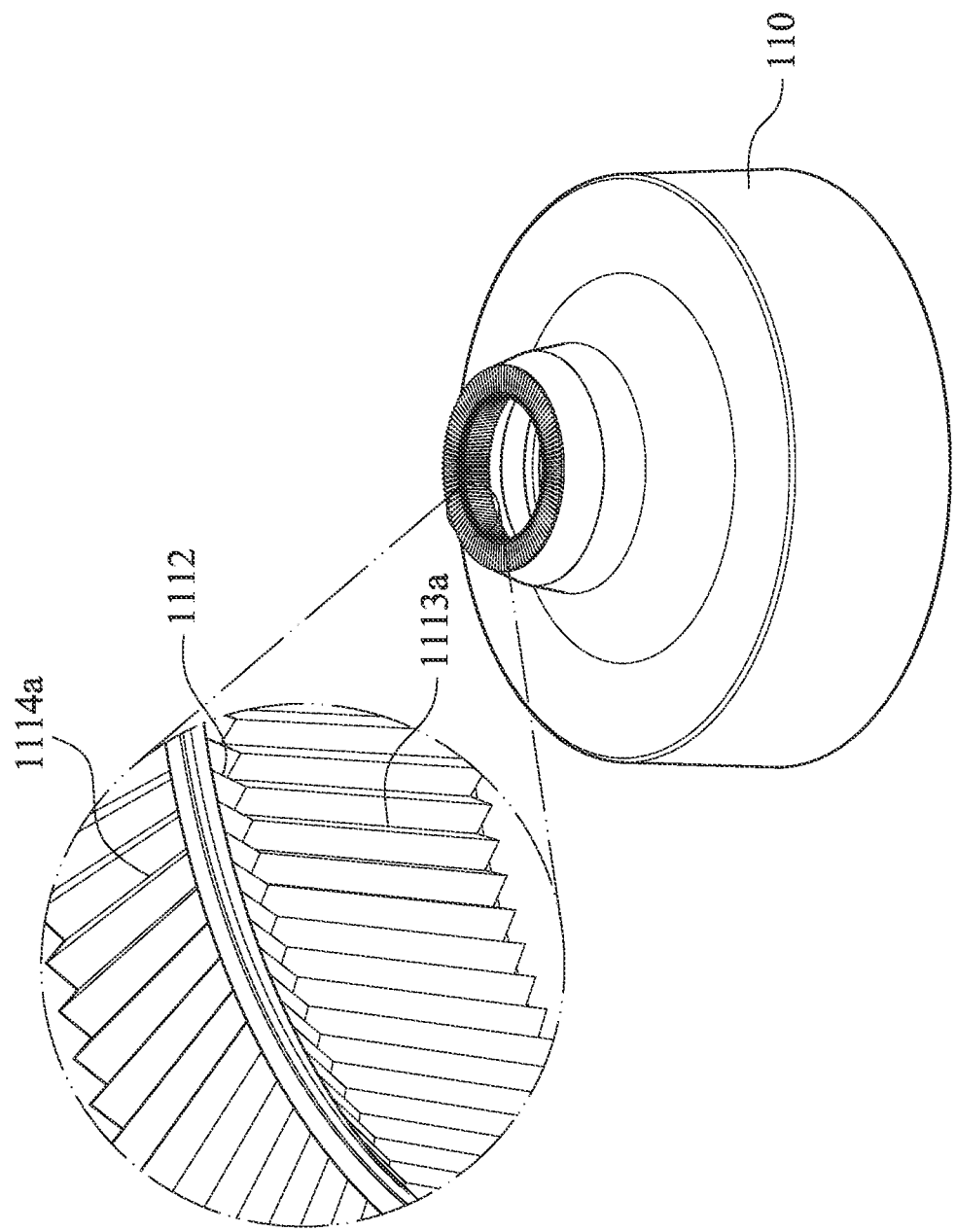
FIG. 1E is a three-dimensional view of the lens barrel according to the 1st embodiment in FIG. 1A.
Figure 1F:
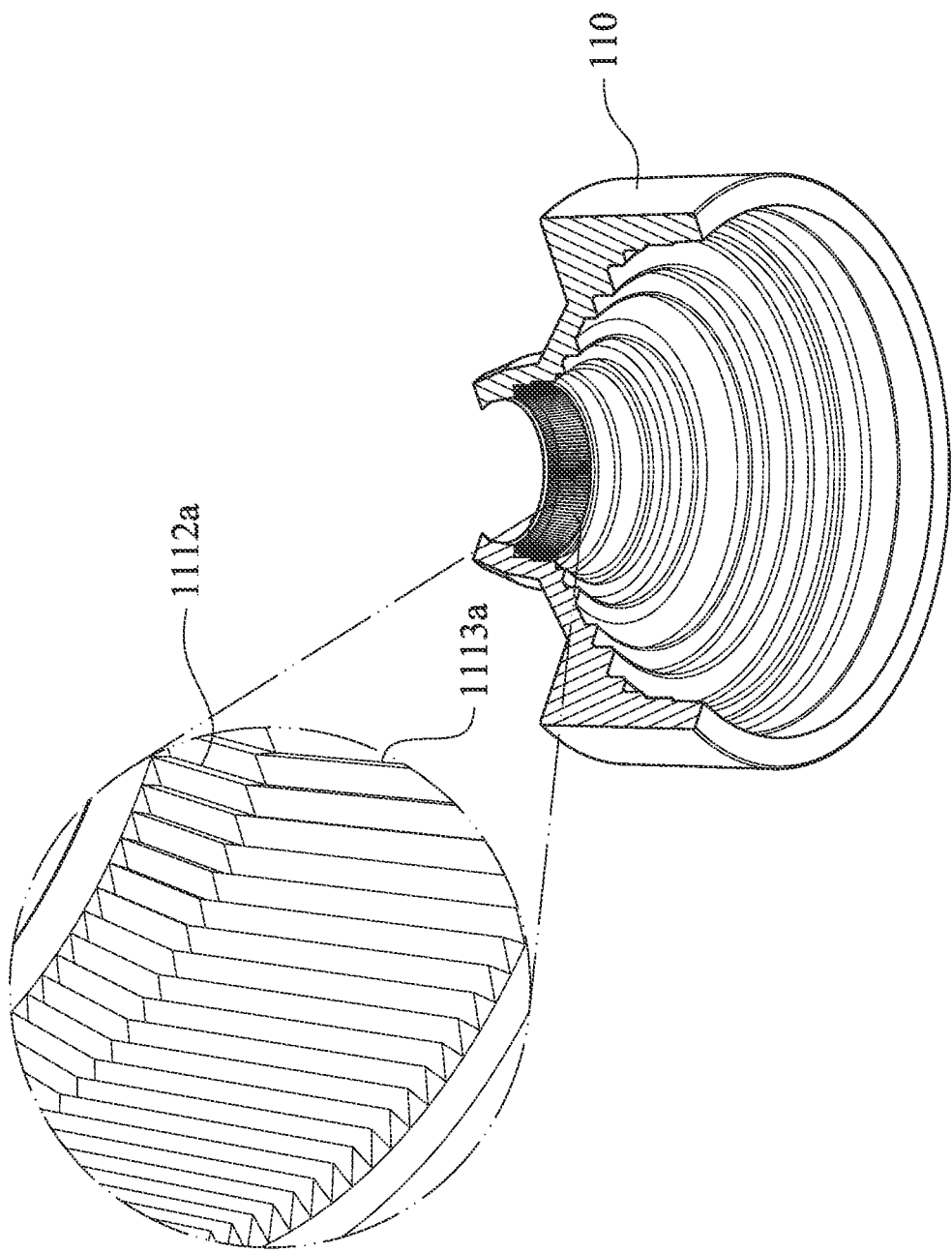
FIG. 1F is a cross-sectional view of the lens barrel according to the 1st embodiment in FIG. 1A.

FIG. 1E is a three-dimensional view of the lens barrel 110 according to the 1st embodiment in FIG. 1A. FIG. 1F is a cross-sectional view of the lens barrel 110 according to the 1st embodiment in FIG. 1A. In FIGS. 1D and 1F, the first reversing inclined surface 1112 includes a plurality of first grooving structures 1112a, the second reversing inclined surface 1113 includes a plurality of second grooving structures 1113a, and the object-side outer surface 1114 includes a plurality of third grooving structures 1114a. The first grooving structures 1112a, the second grooving structures 1113a and the third grooving structures 1114a extend to a direction away from the tip-end minimal aperture 113, and the first grooving structures 1112a, the second grooving structures 1113a and the third grooving structures 1114a are regularly disposed along a circular direction of the optical axis X. In detail, according to the 1st embodiment, a number of the first grooving structures 1112a is N1, and N1=144; a number of the second grooving structures 1113a is N2, and N2=144; a number of the third grooving structures 1114a is N3, and N3=120. Therefore, structural densities of the first reversing inclined surface 1112, the second reversing inclined surface 1113 and the object-side outer surface 1114 are provided.

In FIGS. 1B and 1D, the third grooving structures 1114a are recessed from the reference surface R to an inside of the lens barrel 110. Hence, the object-side outer surface 1114 is connected to the transparent flat plate 130, and the third grooving structures 1114a cannot be contacted with the transparent flat plate 130. Therefore, the possibility of the non-imaging light irradiating to the imaging lens assembly module can be decreased via a disposition of the third grooving structures 1114a close to the aperture stop of the imaging lens assembly module.

In FIGS. 1C and 1D, according to the 1st embodiment, when the axial distance between the tip-end minimal aperture 113 and the first assembling surface 1111 is Da, an axial distance between the aperture stop and the first assembling surface 1111 is Ds, the opening diameter of the tip-end minimal aperture 113 is φBmin, an opening diameter of the aperture stop is φs, a maximum outer diameter of the object-side outer surface 1114 is φo, and a diameter of one of the second assembling surfaces 1121 closest to the object side of the lens barrel 110 is φd, and a minimum opening diameter of a minimum opening among the tip-end minimal aperture 113 of the lens barrel 110 and the openings of the light blocking elements 121 is φmin, the following conditions of the Table 1 are satisfied.

TABLE 1

1st embodiment

| Da (mm) | 0.547 | φd (mm) | 2.280 |
|---|---|---|---|
| Ds (mm) | 0.547 | φmin (mm) | 1.560 |
| φBmin (mm) | 1.657 | φBmin/φd | 0.727 |
| φs (mm) | 1.657 | φs/φmin | 1.062 |
| φo (mm) | 2.352 | | |

According to the 1st embodiment, it should be mentioned that Da=Ds, and φBmin=φs.

2nd Embodiment

Figure 2A:
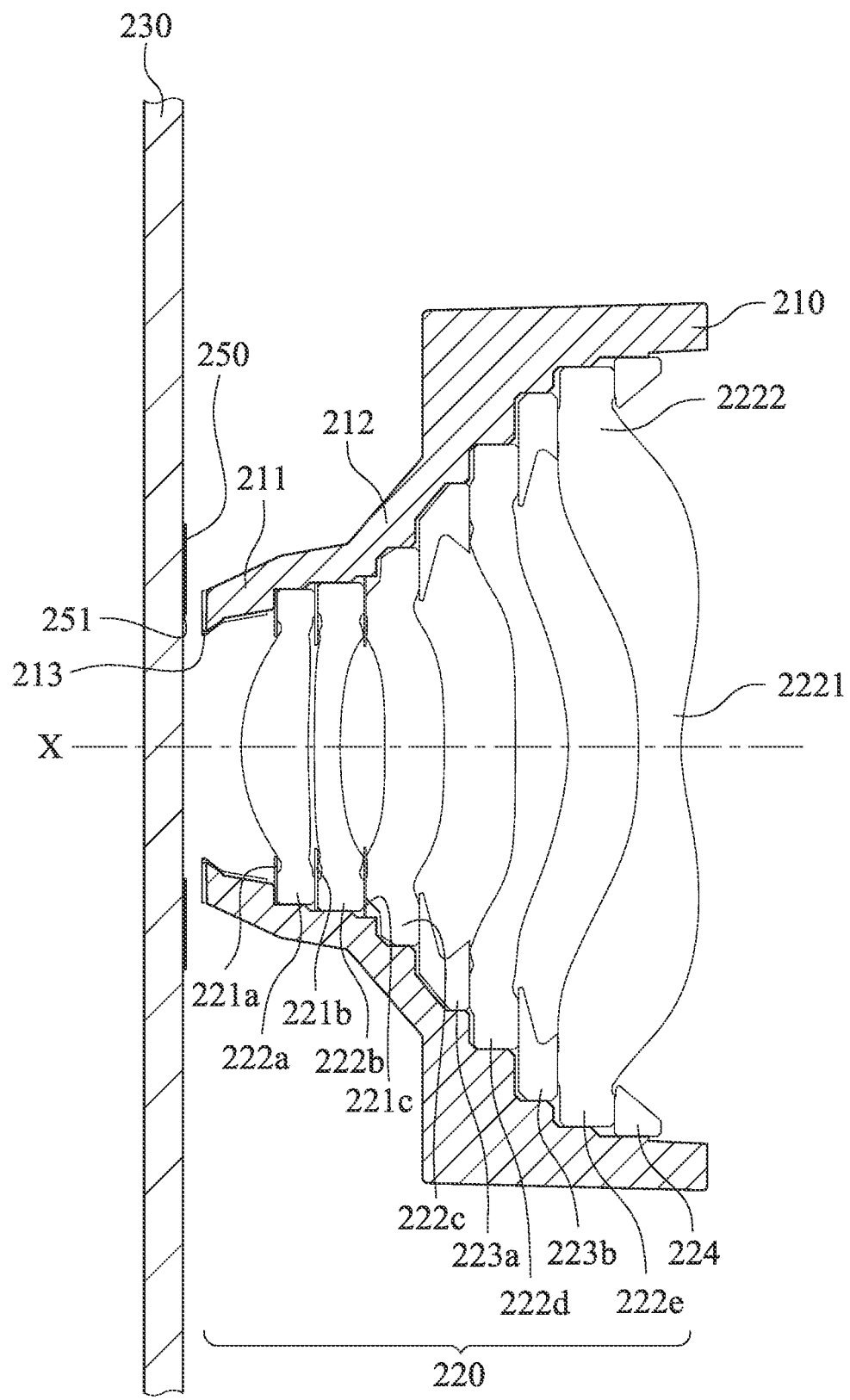
FIG. 2A is a schematic view of a camera module according to the 2nd embodiment of the present disclosure.
Figure 2B:
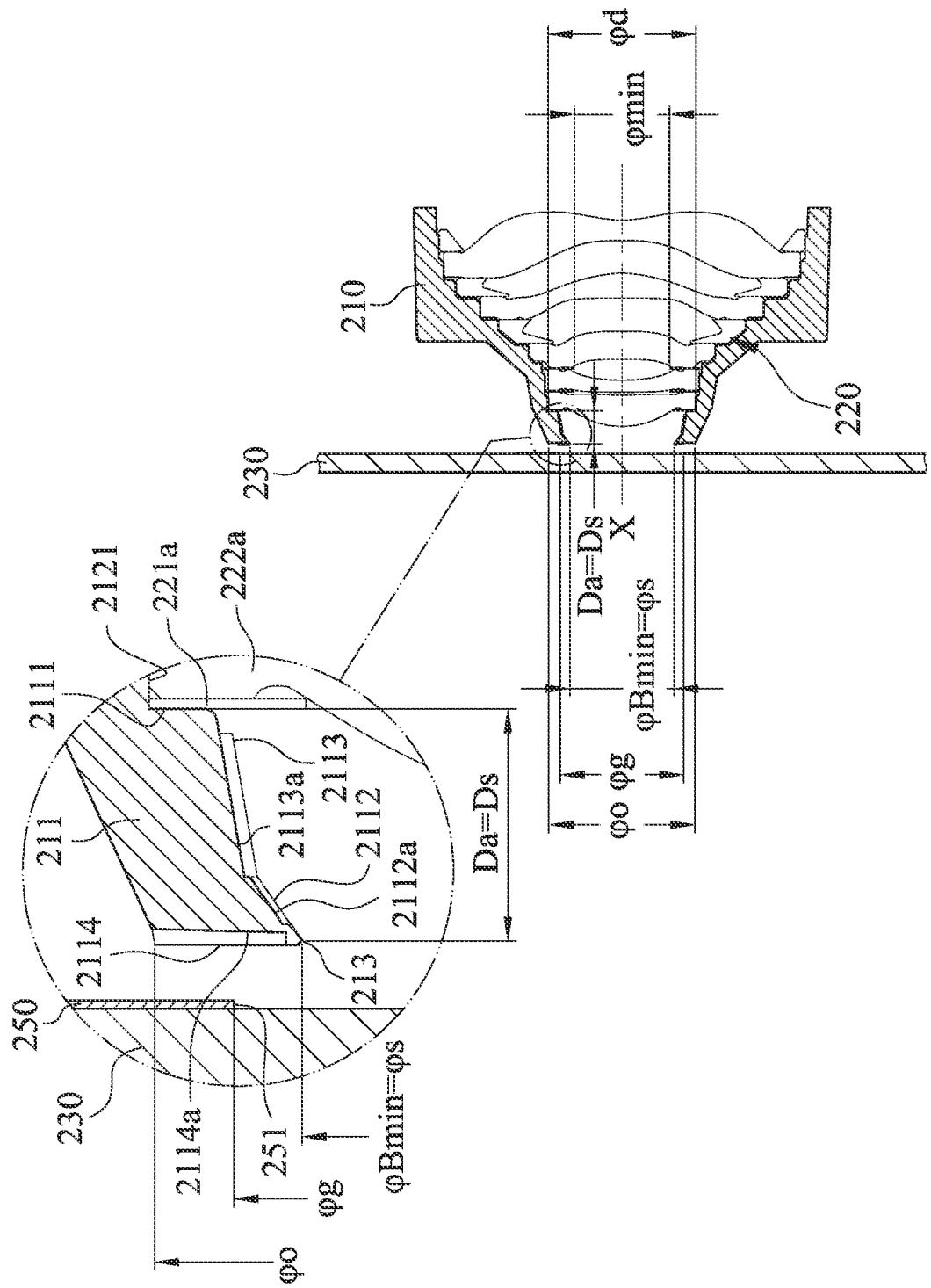
FIG. 2B is a partially enlarged view of an imaging lens assembly module according to the 2nd embodiment in FIG. 2A.
Figure 2C:
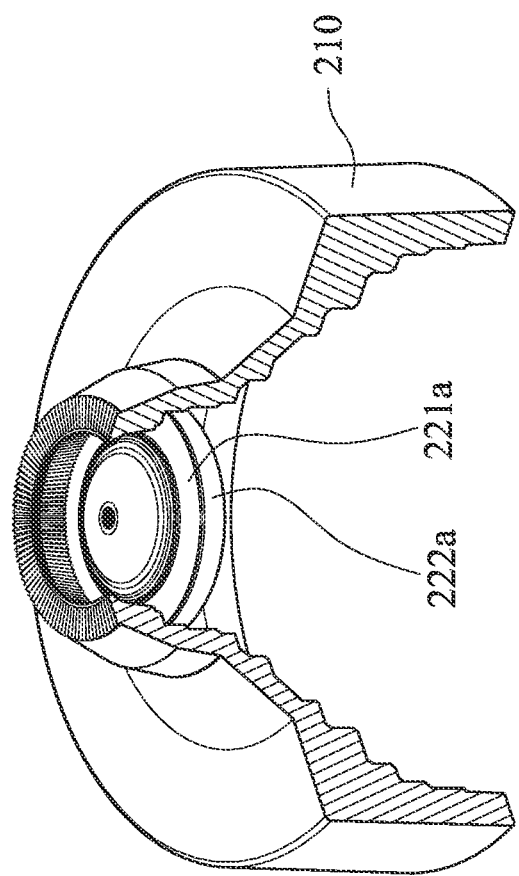
FIG. 2C is schematic view of a lens barrel according to the 2nd embodiment in FIG. 2A.

FIG. 2A is a schematic view of a camera module (its reference numeral is omitted) according to the 2nd embodiment of the present disclosure. FIG. 2B is a partially enlarged view of an imaging lens assembly module according to the 2nd embodiment in FIG. 2A. FIG. 2C is schematic view of a lens barrel 210 according to the 2nd embodiment in FIG. 2A. In FIGS. 2A to 2C, the camera module includes an imaging lens assembly module (its reference numeral is omitted) and an image sensor module (not shown). The imaging lens assembly module has an optical axis X, and includes a lens barrel 210, an optical element set 220, a transparent flat plate 230 and an aperture element 250. The image sensor module includes an image sensor (not shown). In detail, the transparent flat plate 230 is located on an object side of the imaging lens assembly module. The imaging lens assembly module is disposed on the image sensor module, and the imaging lens assembly module can be connected to the image sensor module via the lens barrel 210. The image sensor of the image sensor module is located on an image side of the imaging lens assembly module. The lens barrel 210 of the imaging lens assembly module is disposed on an image side of the transparent flat plate 230, the aperture element 250 is disposed between the transparent flat plat 230 and the lens barrel 210, and the optical element set 220 is disposed in the lens barrel 210.

In detail, the lens barrel 210 includes an object-side portion 211, a tubular portion 212 and a tip-end minimal aperture 213. Both of the object-side portion 211 and the tubular portion 212 surround the optical axis X. The tubular portion 212 is connected to the object-side portion 211, and extends to the image side of the lens barrel 210. The tip-end minimal aperture 213 is symmetrical about the optical axis X as a center, and the tip-end minimal aperture 213 is located on the object-side portion 211. The aperture element 250 includes an aperture opening 251, and the aperture opening 251 surrounds the optical axis X.

According to the 2nd embodiment, the tip-end minimal aperture 213 of the lens barrel 210 is an aperture stop of the imaging lens assembly module for passing an imaging light and controlling the amount of incoming light of the imaging lens assembly module, and an opening diameter of the tip-end minimal aperture 213 is an entrance pupil diameter of the imaging lens assembly module. Therefore, the reflection condition of non-imaging light can be decreased, and it is favorable for obtaining the compact size of the imaging lens assembly module.

The optical element set 220 includes a plurality of light blocking elements and at least one optical lens element, wherein each of the light blocking elements has an opening surrounding the optical axis X, the light blocking elements include at least one light blocking sheet, and the optical element set 220 can further include a plurality of spacers and a retainer, but is not limited thereof. In detail, according to the 2nd embodiment, the optical element set 220, in order from an object side to an image side, includes a light blocking sheet 221a, a first optical lens element 222a, a light blocking sheet 221b, a second optical lens element 222b, a light blocking sheet 221c, a third optical lens element 222c, a spacer 223a, a fourth optical lens element 222d, a spacer 223b, a fifth optical lens element 222e and a retainer 224.

Furthermore, the object-side portion 211 includes a first assembling surface 2111, a first reversing inclined surface 2112, a second reversing inclined surface 2113 and an object-side outer surface 2114. The first assembling surface 2111 faces toward the image side of the lens barrel 210. The first reversing inclined surface 2112 is gradually enlarged from the tip-end minimal aperture 213 to the image side of the lens barrel 210. That is, a diameter of the first reversing inclined surface 2112 is gradually increased from the tip-end minimal aperture 213 to the image side of the lens barrel 210, and the first reversing inclined surface 2112 is not contacted with the optical element set 220 (that is, the first reversing inclined surface 2112 is not directly contacted with the optical element set 220). The second reversing inclined surface 2113 is gradually enlarged from the tip-end minimal aperture 213 to the image side of the lens barrel 210. That is, a diameter of the second reversing inclined surface 2113 is gradually increased from the tip-end minimal aperture 213 to the image side of the lens barrel 210, and an angle between the second reversing inclined surface 2113 and the optical axis X is smaller than an angle between the first reversing inclined surface 2112 and the optical axis X. The tubular portion 212 includes a plurality of second assembling surfaces 2121, wherein all of the second assembling surfaces 2121 face toward the optical axis X, and the second assembling surfaces 2121 are arranged in order from an object side of the lens barrel 210 to the image side of the lens barrel 210, and have different diameters.

The light blocking sheet 221a includes an object-side surface, an image-side surface and an inner opening surface (its reference numeral is omitted, please refer to FIG. 1D according to the 1st embodiment), wherein the object-side surface is disposed on the first assembling surface 2111, and the inner opening surface is connected to the object-side surface and the image-side surface and corresponding to the tip-end minimal aperture 213. The fifth optical lens element 222e, in order from the optical axis X to a peripheral region of the fifth optical lens element 222e, includes an optical effective portion 2221 and a peripheral portion 2222. The peripheral portion 2222 surrounds the optical effective portion 2221, and is disposed on one of the second assembling surfaces 2121. According to the 2nd embodiment, it should be mentioned that each light blocking sheet (includes the light blocking sheets 221b, 221c) of the optical element set 220 includes the object-side surface, the image-side surface and the inner opening surface, and the disposition thereof is the same as the light blocking sheet 221a. Also, each optical lens element (includes the first lens element 222a, the second lens element 222b, the third lens element 222c, the fourth lens element 222d) includes the optical effective portion and the peripheral portion, and the disposition thereof is the same as the fifth lens element 222e. Hence, only the light blocking sheet 221a and the fifth optical lens element 222e are described herein.

The aperture element 250 is disposed between the transparent flat plate 230 and the first assembling surface 2111, and the aperture element 250 is contacted with the transparent flat plate 230, wherein the aperture element 250 can be a light blocking coating, the light blocking sheet or a spacer. The aperture element 250 is the light blocking coating according to the 2nd embodiment. In detail, the light blocking coating is disposed between the transparent flat plate 230 and the object-side outer surface 2114, but is not limited thereto. Therefore, the disposition of the aperture element 250 is favorable for obtaining the compact size of the imaging lens assembly module.

Moreover, the tip-end minimal aperture 213, the first reversing inclined surface 2112 and the second reversing inclined surface 2113 are arranged in order from the object side of the lens barrel 210 to the image side of the lens barrel 210. Therefore, a draft angle of injection molding can be provided, and an effect of decreasing a formation of the stray light can be kept.

Figure 2D:
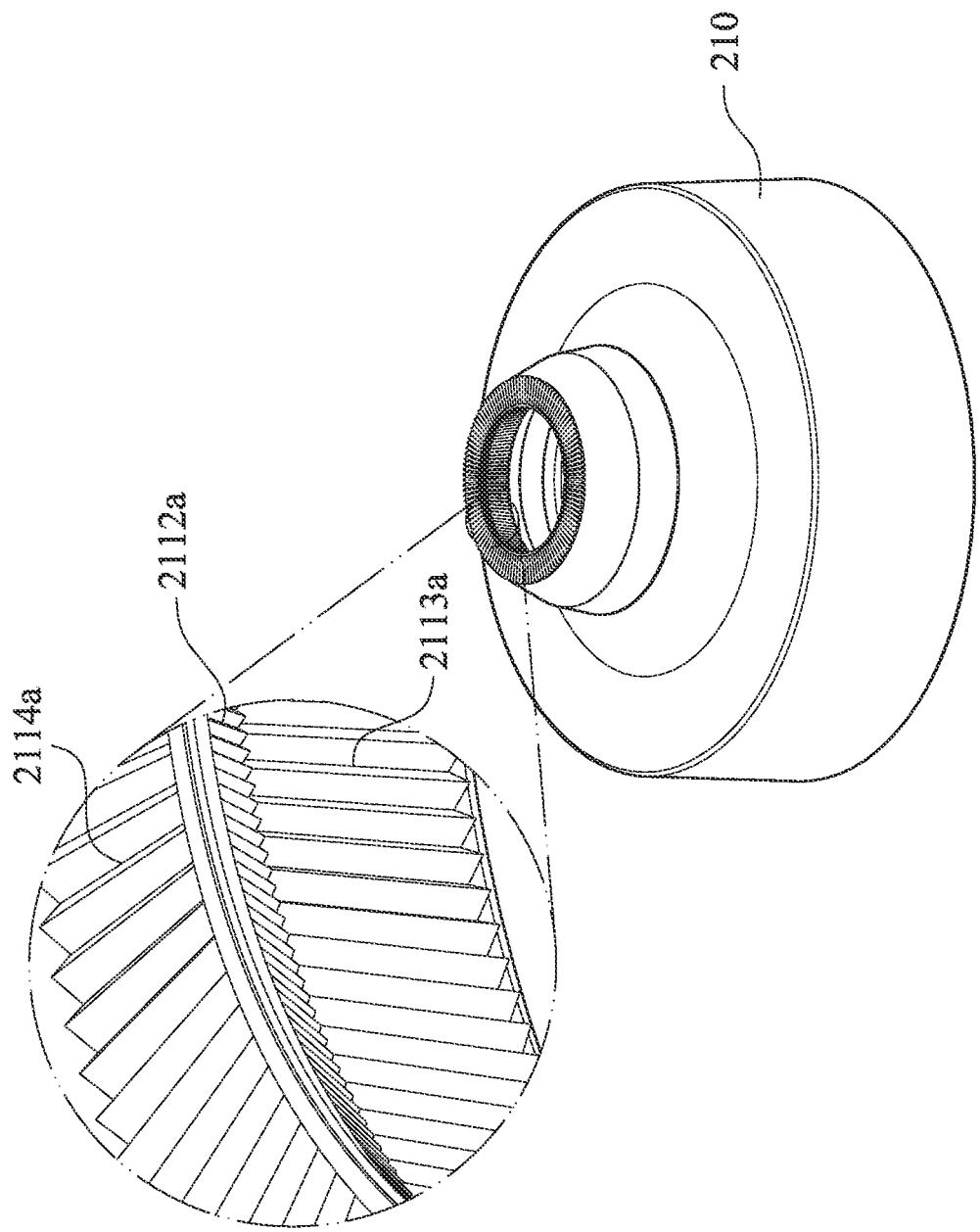
FIG. 2D is a three-dimensional view of the lens barrel according to the 2nd embodiment in FIG. 2A.

FIG. 2D is a three-dimensional view of the lens barrel 210 according to the 2nd embodiment in FIG. 2A. In FIG. 2D, the first reversing inclined surface 2112 includes a plurality of first grooving structures 2112a, the second reversing inclined surface 2113 includes a plurality of second grooving structures 2113a, and the object-side outer surface 2114 includes a plurality of third grooving structures 2114a. The first grooving structures 2112a, the second grooving structures 2113a and the third grooving structures 2114a extend to a direction away from the tip-end minimal aperture 213, and the first grooving structures 2112a, the second grooving structures 2113a and the third grooving structures 2114a are regularly disposed along a circular direction of the optical axis X. In detail, according to the 2nd embodiment, a number of the first grooving structures 2112a is N1, and N1=288; a number of the second grooving structures 2113a is N2, and N2=144; a number of the third grooving structures 2114a is N3, and N3=120. Thus, the number of the first grooving structures 2112a can be different from the second grooving structures 2113a. Therefore, structural complexities of the first grooving structures 2112a and the second grooving structures 2113a can be provided, and structural densities of the first reversing inclined surface 2112, the second reversing inclined surface 2113 and the object-side outer surface 2114 are provided.

In FIG. 2B, according to the 2nd embodiment, an opening diameter of the aperture opening 251 of the aperture element 250 is φg, another definitions of another parameters are the same as the 1st embodiment, and will not be described again herein. Please refer to the Table 2.

TABLE 2

| 2nd embodiment | | | |
|---|---|---|---|
| Da (mm) | 0.547 | φd (mm) | 2.440 |
| Ds (mm) | 0.547 | φmin (mm) | 1.560 |
| φBmin (mm) | 1.717 | φBmin/φd | 0.704 |
| φs (mm) | 1.717 | φs/φmin | 1.101 |
| φo (mm) | 2.412 | φg/φmin | 1.308 |
| φg (mm) | 2.040 | | |

According to the 2nd embodiment, it should be mentioned that Da=Ds, and φBmin=φs.

3rd Embodiment

Figure 3A:
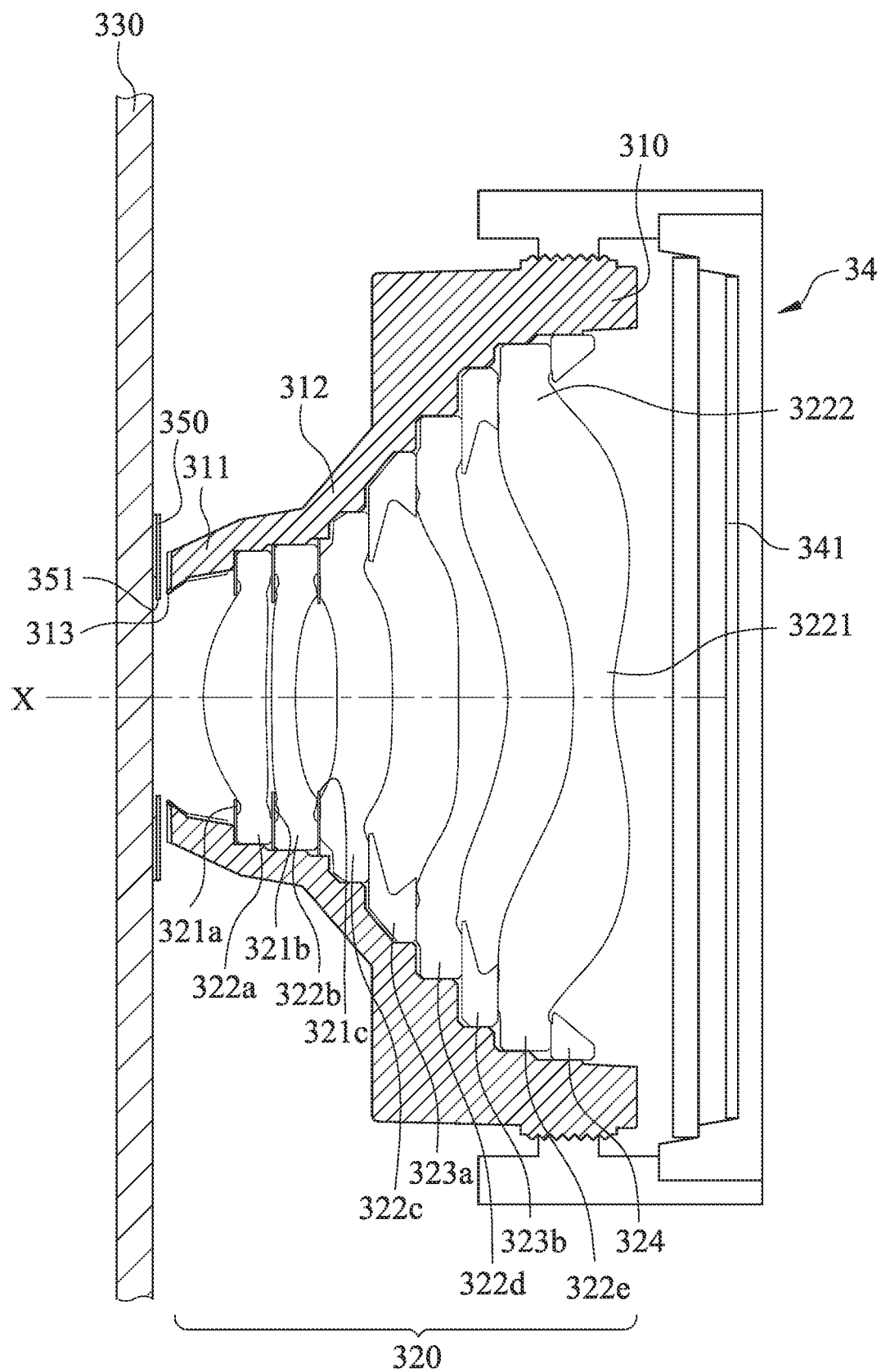
FIG. 3A is a schematic view of a camera module according to the 3rd embodiment of the present disclosure.
Figure 3B:
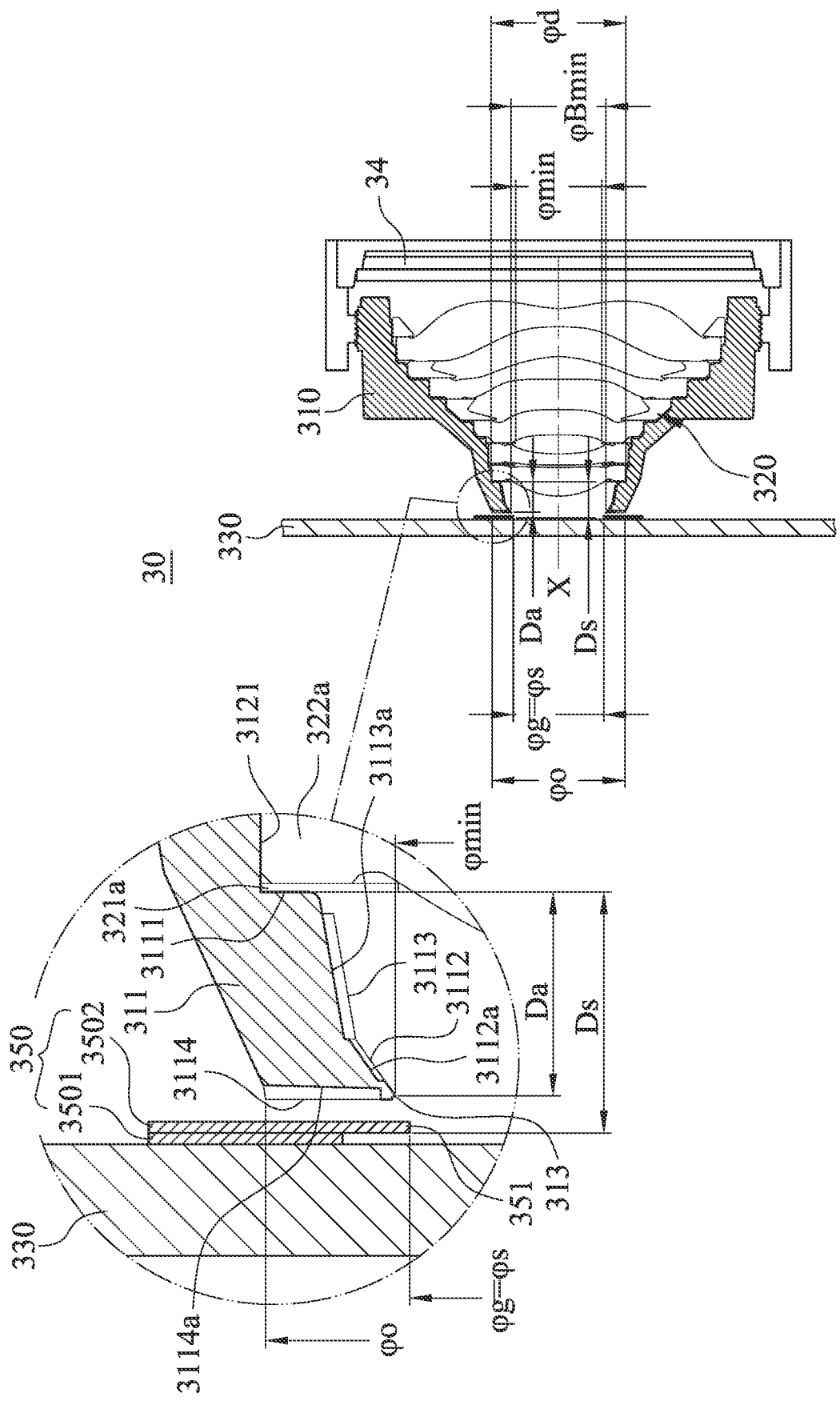
FIG. 3B is a partially enlarged view of the camera module according to the 3rd embodiment in FIG. 3A.

FIG. 3A is a schematic view of a camera module 30 according to the 3rd embodiment of the present disclosure. FIG. 3B is a partially enlarged view of the camera module 30 according to the 3rd embodiment in FIG. 3A. In FIG. 3A, the camera module 30 includes an imaging lens assembly module (its reference numeral is omitted) and an image sensor module 34. The imaging lens assembly module has an optical axis X, and includes a lens barrel 310, an optical element set 320, a transparent flat plate 330 and an aperture element 350. The image sensor module 34 includes an image sensor 341. In detail, the transparent flat plate 330 is located on an object side of the imaging lens assembly module. The imaging lens assembly module is disposed on the image sensor module 34, and the imaging lens assembly module can be connected to the image sensor module 34 via the lens barrel 310. The image sensor 341 of the image sensor module 34 is located on an image side of the imaging lens assembly module. The lens barrel 310 of the imaging lens assembly module is disposed on an image side of the transparent flat plate 330, the aperture element 350 is disposed between the transparent flat plat 330 and the lens barrel 310, and the optical element set 320 is disposed in the lens barrel 310.

In detail, the lens barrel 310 includes an object-side portion 311, a tubular portion 312 and a tip-end minimal aperture 313. Both of the object-side portion 311 and the tubular portion 312 surround the optical axis X. The tubular portion 312 is connected to the object-side portion 311, and extends to the image side of the lens barrel 310. The tip-end minimal aperture 313 is symmetrical about the optical axis X as a center, and the tip-end minimal aperture 313 is located on the object-side portion 311. The aperture element 350 includes an aperture opening 351, and the aperture opening 351 surrounds the optical axis X.

According to the 3rd embodiment, the aperture opening 351 of the aperture element 350 is an aperture stop of the imaging lens assembly module for passing an imaging light and controlling the amount of incoming light of the imaging lens assembly module, and an opening diameter of the aperture opening 351 is an entrance pupil diameter of the imaging lens assembly module. Therefore, the reflection condition of non-imaging light can be decreased, and it is favorable for obtaining the compact size of the imaging lens assembly module.

The optical element set 320 includes a plurality of light blocking elements and at least one optical lens element, wherein each of the light blocking elements has an opening surrounding the optical axis X, the light blocking elements include at least one light blocking sheet, and the optical element set 320 can further include a plurality of spacers and a retainer, but is not limited thereof. In detail, according to the 3rd embodiment, the optical element set 320, in order from an object side to an image side, includes a light blocking sheet 321a, a first optical lens element 322a, a light blocking sheet 321b, a second optical lens element 322b, a light blocking sheet 321c, a third optical lens element 322c, a spacer 323a, a fourth optical lens element 322d, a spacer 323b, a fifth optical lens element 322e and a retainer 324. Therefore, it is favorable for decreasing the reflection condition of non-imaging light of the imaging lens assembly module according the 3rd embodiment.

Furthermore, the object-side portion 311 includes a first assembling surface 3111, a first reversing inclined surface 3112, a second reversing inclined surface 3113 and an object-side outer surface 3114. The first assembling surface 3111 faces toward the image side of the lens barrel 310. The first reversing inclined surface 3112 is gradually enlarged from the tip-end minimal aperture 313 to the image side of the lens barrel 310. That is, a diameter of the first reversing inclined surface 3112 is gradually increased from the tip-end minimal aperture 313 to the image side of the lens barrel 310, and the first reversing inclined surface 3112 is not contacted with the optical element set 320 (that is, the first reversing inclined surface 3112 is not directly contacted with the optical element set 320). The second reversing inclined surface 3113 is gradually enlarged from the tip-end minimal aperture 313 to the image side of the lens barrel 310. That is, a diameter of the second reversing inclined surface 3113 is gradually increased from the tip-end minimal aperture 313 to the image side of the lens barrel 310, and an angle between the second reversing inclined surface 3113 and the optical axis X is smaller than an angle between the first reversing inclined surface 3112 and the optical axis X. The tubular portion 312 includes a plurality of second assembling surfaces 3121, wherein all of the second assembling surfaces 3121 face toward the optical axis X, and the second assembling surfaces 3121 are arranged in order from an object side of the lens barrel 310 to the image side of the lens barrel 310, and have different diameters.

The light blocking sheet 321a includes an object-side surface, an image-side surface and an inner opening surface (its reference numeral is omitted, please refer to FIG. 1D according to the 1st embodiment), wherein the object-side surface is disposed on the first assembling surface 3111, and the inner opening surface is connected to the object-side surface and the image-side surface and corresponding to the tip-end minimal aperture 313. The fifth optical lens element 322e, in order from the optical axis X to a peripheral region of the fifth optical lens element 322e, includes an optical effective portion 3221 and a peripheral portion 3222. The peripheral portion 3222 surrounds the optical effective portion 3221, and is disposed on one of the second assembling surfaces 3121. According to the 3rd embodiment, it should be mentioned that each light blocking sheet (includes the light blocking sheets 321b, 321c) of the optical element set 320 includes the object-side surface, the image-side surface and the inner opening surface, and the disposition thereof is the same as the light blocking sheet 321a. Also, each optical lens element (includes the first lens element 322a, the second lens element 322b, the third lens element 322c, the fourth lens element 322d) includes the optical effective portion and the peripheral portion, and the disposition thereof is the same as the fifth lens element 322e. Hence, only the light blocking sheet 321a and the fifth optical lens element 322e are described herein.

The aperture element 350 is disposed between the transparent flat plate 330 and the first assembling surface 3111, and the aperture element 350 is contacted with the transparent flat plate 330. In detail, the aperture element 350 is disposed between the transparent flat plate 330 and the object-side outer surface 3114, but is not limited thereto. According to the 3rd embodiment, the aperture element 350 is formed via two light blocking sheets 3501, 3502, and the aperture opening 351 as the aperture stop is located on the light blocking sheet 3502, but is not limited thereto. Therefore, the disposition of the aperture element 350 is favorable for obtaining the compact size of the imaging lens assembly module.

Moreover, the tip-end minimal aperture 313, the first reversing inclined surface 3112 and the second reversing inclined surface 3113 are arranged in order from the object side of the lens barrel 310 to the image side of the lens barrel 310. Therefore, a draft angle of injection molding can be provided, and an effect of decreasing a formation of the stray light can be kept.

In detail, the first reversing inclined surface 3112 includes a plurality of first grooving structures 3112a, the second reversing inclined surface 3113 includes a plurality of second grooving structures 3113a, and the object-side outer surface 3114 includes a plurality of third grooving structures 3114a. The first grooving structures 3112a, the second grooving structures 3113a and the third grooving structures 3114a extend to a direction away from the tip-end minimal aperture 313, and the first grooving structures 3112a, the second grooving structures 3113a and the third grooving structures 3114a are regularly disposed along a circular direction of the optical axis X. In detail, according to the 3rd embodiment, a number of the first grooving structures 3112a is N1, and N1=240; a number of the second grooving structures 3113a is N2, and N2=120; a number of the third grooving structures 3114a is N3, and N3=144. Thus, the number of the first grooving structures 3112a can be different from the second grooving structures 3113a. Therefore, structural complexities of the first grooving structures 3112a and the second grooving structures 3113a can be provided, and structural densities of the first reversing inclined surface 3112, the second reversing inclined surface 3113 and the object-side outer surface 3114 are provided.

In FIG. 3B, according to the 3rd embodiment, every definition of ever parameter is the same as the 1st embodiment and the 2nd embodiment, and will not be described again herein. Please refer to the Table 3.

TABLE 3

| 3rd embodiment | | | |
|---|---|---|---|
| Da (mm) | 0.547 | φd (mm) | 2.440 |
| Ds (mm) | 0.647 | φmin (mm) | 1.560 |
| φBmin (mm) | 1.717 | φBmin/φd | 0.704 |
| φs (mm) | 1.640 | φs/φmin | 1.051 |
| φo (mm) | 2.412 | φg/φmin | 1.051 |
| φg (mm) | 1.640 | | |

According to the 3rd embodiment, it should be mentioned that φg=φs.

4th Embodiment

Figure 4A:
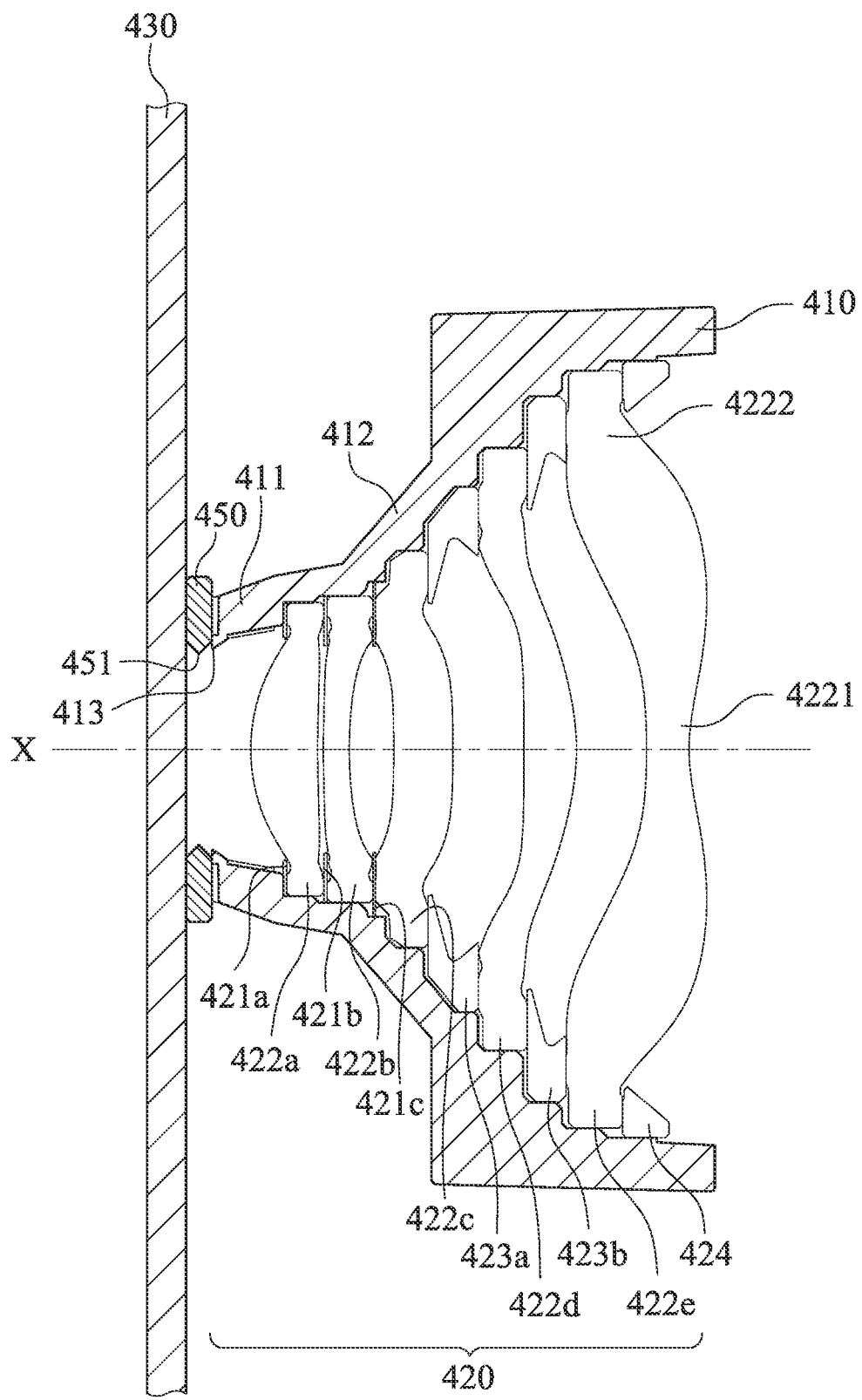
FIG. 4A is a schematic view of a camera module according to the 4th embodiment of the present disclosure.
Figure 4B:
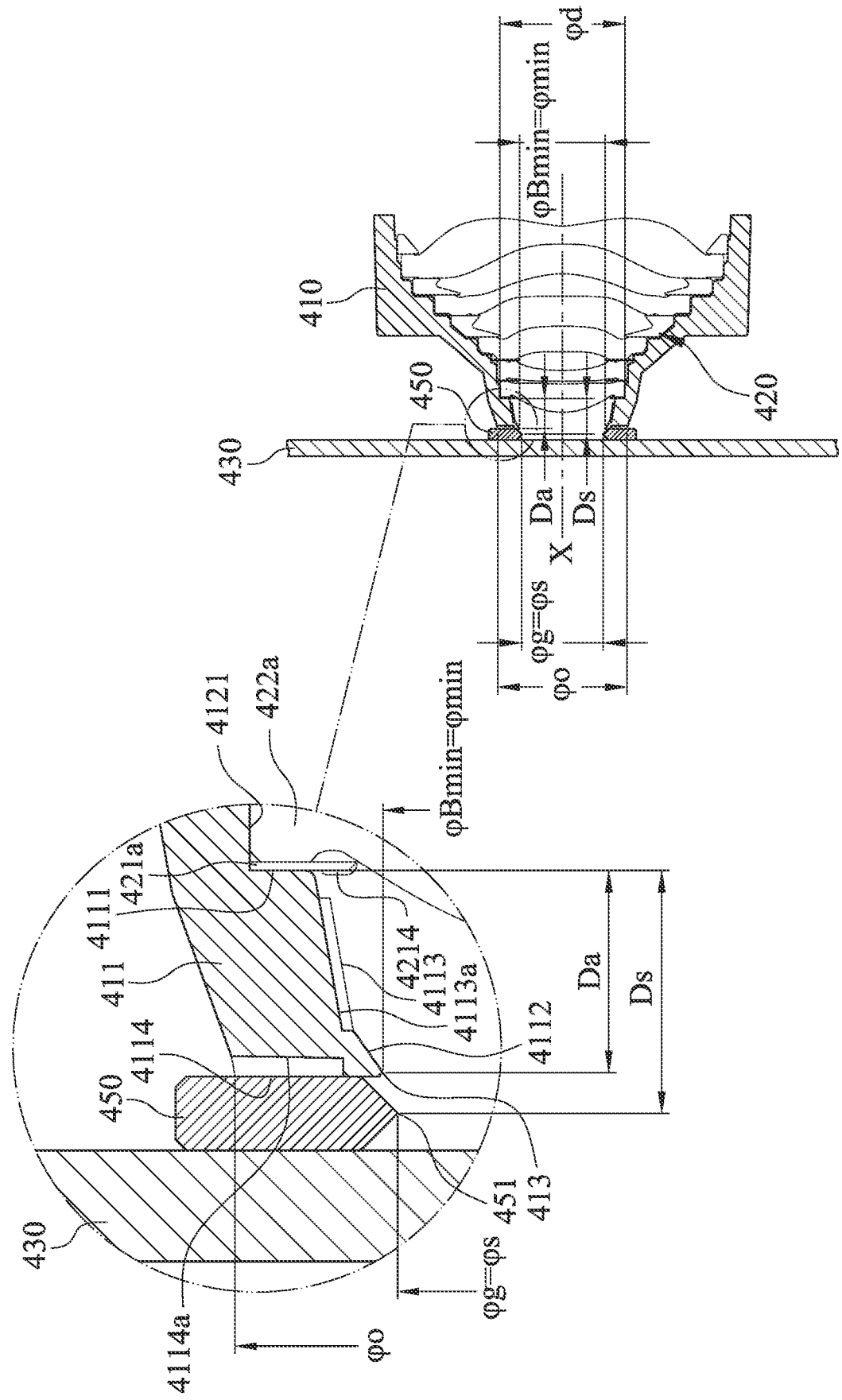
FIG. 4B is a partially enlarged view of an imaging lens assembly module according to the 4th embodiment in FIG. 4A.
Figure 4C:
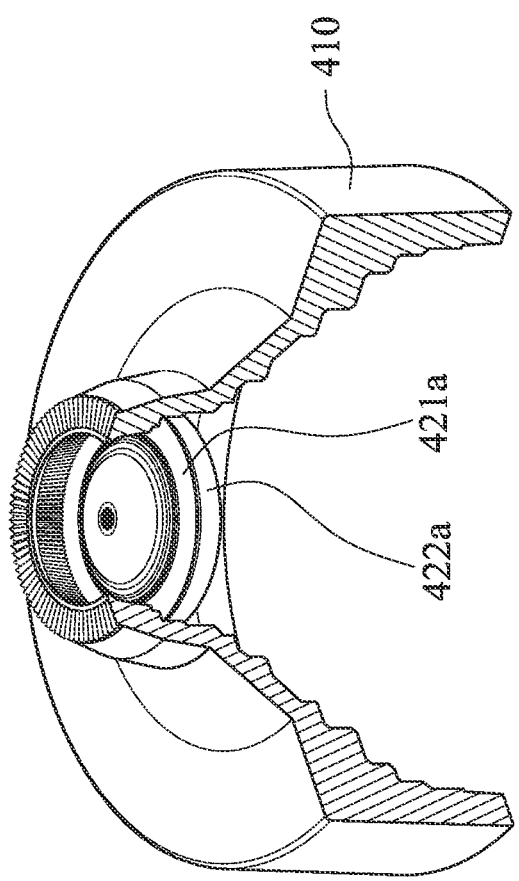
FIG. 4C is a schematic view of a lens barrel according to the 4th embodiment in FIG. 4A.

FIG. 4A is a schematic view of a camera module (its reference is omitted) according to the 4th embodiment of the present disclosure. FIG. 4B is a partially enlarged view of an imaging lens assembly module according to the 4th embodiment in FIG. 4A. FIG. 4C is a schematic view of a lens barrel 410 according to the 4th embodiment in FIG. 4A. In FIGS. 4A to 4C, the camera module includes an imaging lens assembly module (its reference numeral is omitted) and an image sensor module (not shown). The imaging lens assembly module has an optical axis X, and includes a lens barrel 410, an optical element set 420, a transparent flat plate 430 and an aperture element 450. The image sensor module includes an image sensor (not shown). In detail, the transparent flat plate 430 is located on an object side of the imaging lens assembly module. The imaging lens assembly module is disposed on the image sensor module, and the imaging lens assembly module can be connected to the image sensor module via the lens barrel 410. The image sensor of the image sensor module is located on an image side of the imaging lens assembly module. The lens barrel 410 of the imaging lens assembly module is disposed on an image side of the transparent flat plate 430, the aperture element 450 is disposed between the transparent flat plat 430 and the lens barrel 410, and the optical element set 420 is disposed in the lens barrel 410.

In detail, the lens barrel 410 includes an object-side portion 411, a tubular portion 412 and a tip-end minimal aperture 413. Both of the object-side portion 411 and the tubular portion 412 surround the optical axis X. The tubular portion 412 is connected to the object-side portion 411, and extends to the image side of the lens barrel 410. The tip-end minimal aperture 413 is symmetrical about the optical axis X as a center, and the tip-end minimal aperture 413 is located on the object-side portion 411. The aperture element 450 includes an aperture opening 451, and the aperture opening 451 surrounds the optical axis X.

According to the 4th embodiment, the aperture opening 451 of the aperture element 450 is an aperture stop of the imaging lens assembly module for passing an imaging light and controlling the amount of incoming light of the imaging lens assembly module, and an opening diameter of the aperture opening 451 is an entrance pupil diameter of the imaging lens assembly module. Therefore, the reflection condition of non-imaging light can be decreased, and it is favorable for obtaining the compact size of the imaging lens assembly module.

The optical element set 420 includes a plurality of light blocking elements and at least one optical lens element, wherein each of the light blocking elements has an opening surrounding the optical axis X, the light blocking elements include at least one light blocking sheet, and the optical element set 420 can further include a plurality of spacers and a retainer, but is not limited thereof. In detail, according to the 4th embodiment, the optical element set 420, in order from an object side to an image side, includes a light blocking sheet 421a, a first optical lens element 422a, a light blocking sheet 421b, a second optical lens element 422b, a light blocking sheet 421c, a third optical lens element 422c, a spacer 423a, a fourth optical lens element 422d, a spacer 423b, a fifth optical lens element 422e and a retainer 424. Therefore, it is favorable for decreasing the reflection condition of non-imaging light of the imaging lens assembly module according the 4th embodiment.

Furthermore, the object-side portion 411 includes a first assembling surface 4111, a first reversing inclined surface 4112, a second reversing inclined surface 4113 and an object-side outer surface 4114. The first assembling surface 4111 faces toward the image side of the lens barrel 410. The first reversing inclined surface 4112 is gradually enlarged from the tip-end minimal aperture 413 to the image side of the lens barrel 410. That is, a diameter of the first reversing inclined surface 4112 is gradually increased from the tip-end minimal aperture 413 to the image side of the lens barrel 410, and the first reversing inclined surface 4112 is not contacted with the optical element set 420 (that is, the first reversing inclined surface 4112 is not directly contacted with the optical element set 420). The second reversing inclined surface 4113 is gradually enlarged from the tip-end minimal aperture 413 to the image side of the lens barrel 410. That is, a diameter of the second reversing inclined surface 4113 is gradually increased from the tip-end minimal aperture 413 to the image side of the lens barrel 410, and an angle between the second reversing inclined surface 4113 and the optical axis X is smaller than an angle between the first reversing inclined surface 4112 and the optical axis X. The tubular portion 412 includes a plurality of second assembling surfaces 4121, wherein all of the second assembling surfaces 4121 face toward the optical axis X, and the second assembling surfaces 4121 are arranged in order from an object side of the lens barrel 410 to the image side of the lens barrel 410, and have different diameters.

The light blocking sheet 421a includes an object-side surface, an image-side surface and an inner opening surface (its reference numeral is omitted, please refer to FIG. 1D according to the 1st embodiment), wherein the object-side surface is disposed on the first assembling surface 4111, and the inner opening surface is connected to the object-side surface and the image-side surface and corresponding to the tip-end minimal aperture 413. The fifth optical lens element 422e, in order from the optical axis X to a peripheral region of the fifth optical lens element 422e, includes an optical effective portion 4221 and a peripheral portion 4222. The peripheral portion 4222 surrounds the optical effective portion 4221, and is disposed on one of the second assembling surfaces 4121. According to the 4th embodiment, it should be mentioned that each light blocking sheet (includes the light blocking sheets 421b, 421c) of the optical element set 420 includes the object-side surface, the image-side surface and the inner opening surface, and the disposition thereof is the same as the light blocking sheet 421a. Also, each optical lens element (includes the first lens element 422a, the second lens element 422b, the third lens element 422c, the fourth lens element 422d) includes the optical effective portion and the peripheral portion, and the disposition thereof is the same as the fifth lens element 422e. Hence, only the light blocking sheet 421a and the fifth optical lens element 422e are described herein.

Furthermore, the inner opening surface of the light blocking sheet can be a conical surface, and be gradually enlarged from an image side of the optical element set 420 to an object side of the optical element set 420. In FIG. 4B, the light blocking sheet 421a can further include a matt film layer 4214, and the matt film layer 4214 is disposed on at least one portion of the object-side surface and the inner opening surface of the light blocking sheet 421a, wherein the matt film layer 4214 can be an anti-reflection film or a black ink, but is not limited thereof.

The aperture element 450 is disposed between the transparent flat plate 430 and the first assembling surface 4111, and the aperture element 450 is contacted with the transparent flat plate 430. In detail, the aperture element 450 is disposed between the transparent flat plate 430 and the object-side outer surface 4114, but is not limited thereto. According to the 4th embodiment, the aperture element 450 is a plastic spacer, but is not limited thereof. Therefore, the disposition of the aperture element 450 is favorable for obtaining the compact size of the imaging lens assembly module.

Moreover, the tip-end minimal aperture 413, the first reversing inclined surface 4112 and the second reversing inclined surface 4113 are arranged in order from the object side of the lens barrel 410 to the image side of the lens barrel 410. Therefore, a draft angle of injection molding can be provided, and an effect of decreasing a formation of the stray light can be kept.

Figure 4D:
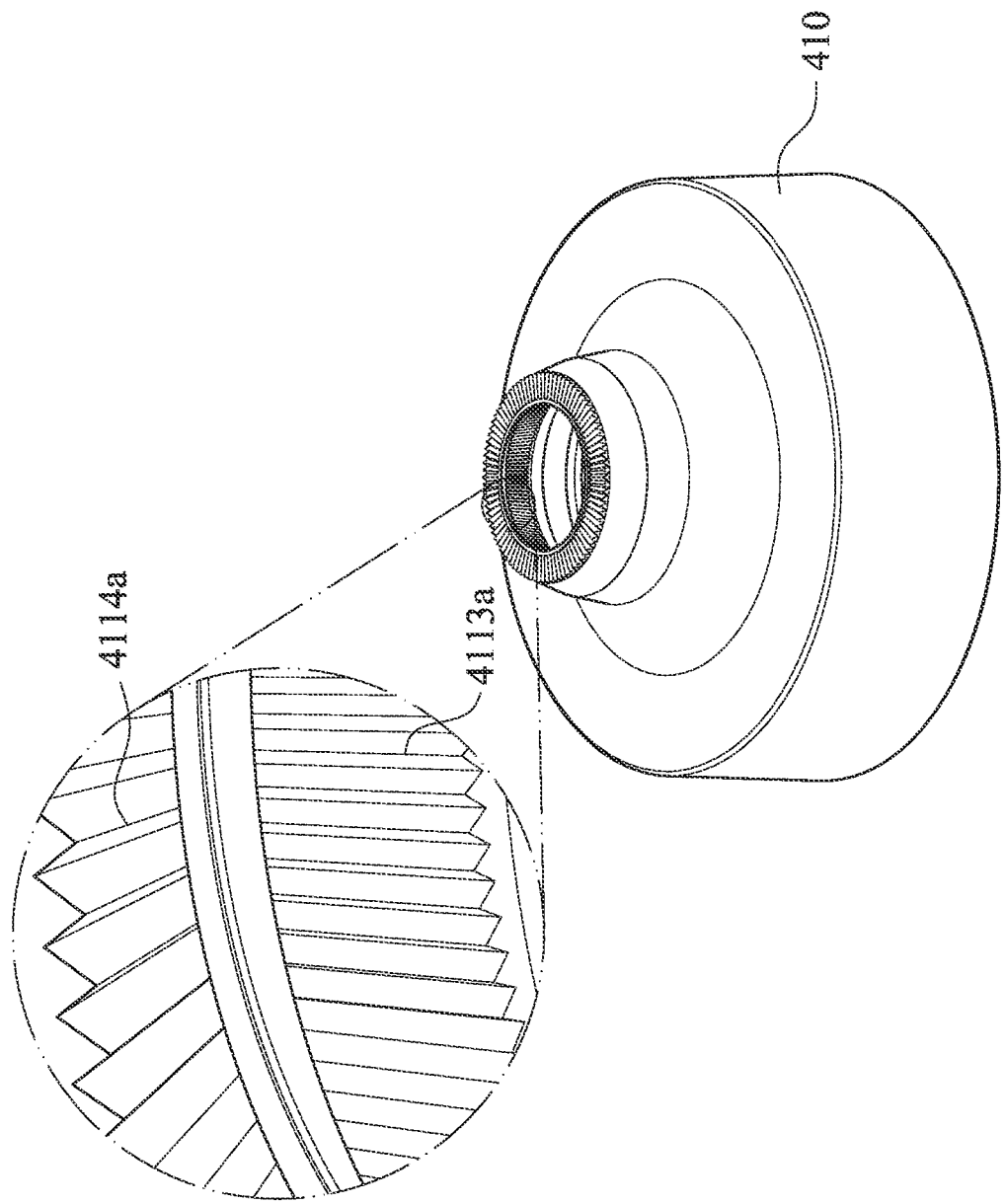
FIG. 4D is a three-dimensional view of the lens barrel according to the 4th embodiment in FIG. 4A.

FIG. 4D is a three-dimensional view of the lens barrel 410 according to the 4th embodiment in FIG. 4A. In FIG. 4D, the second reversing inclined surface 4113 includes a plurality of second grooving structures 4113a, and the object-side outer surface 4114 includes a plurality of third grooving structures 4114a. The second grooving structures 4113a and the third grooving structures 4114a extend to a direction away from the tip-end minimal aperture 413, and the second grooving structures 4113a and the third grooving structures 4114a are regularly disposed along a circular direction of the optical axis X. In detail, according to the 4th embodiment, a number of the second grooving structures 4113a is N2, and N2=144; a number of the third grooving structures 4114a is N3, and N3=90. Therefore, structural densities of the second reversing inclined surface 4113 and the object-side outer surface 4114 are provided.

In FIG. 4B, according to the 4th embodiment, every definition of ever parameter is the same as the 1st embodiment and the 2nd embodiment, and will not be described again herein. Please refer to the Table 4.

TABLE 4

| 4th embodiment | | | |
|---|---|---|---|
| Da (mm) | 0.547 | φd (mm) | 2.280 |
| Ds (mm) | 0.657 | φmin (mm) | 1.560 |
| φBmin (mm) | 1.560 | φBmin/φd | 0.684 |
| φs (mm) | 1.480 | φs/φmin | 0.949 |
| φo (mm) | 2.358 | φg/φmin | 0.949 |
| φg (mm) | 1.480 | | |

According to the 4th embodiment, it should be mentioned that φg=φs, and φBmin=φmin.

5th Embodiment

Figure 5A:
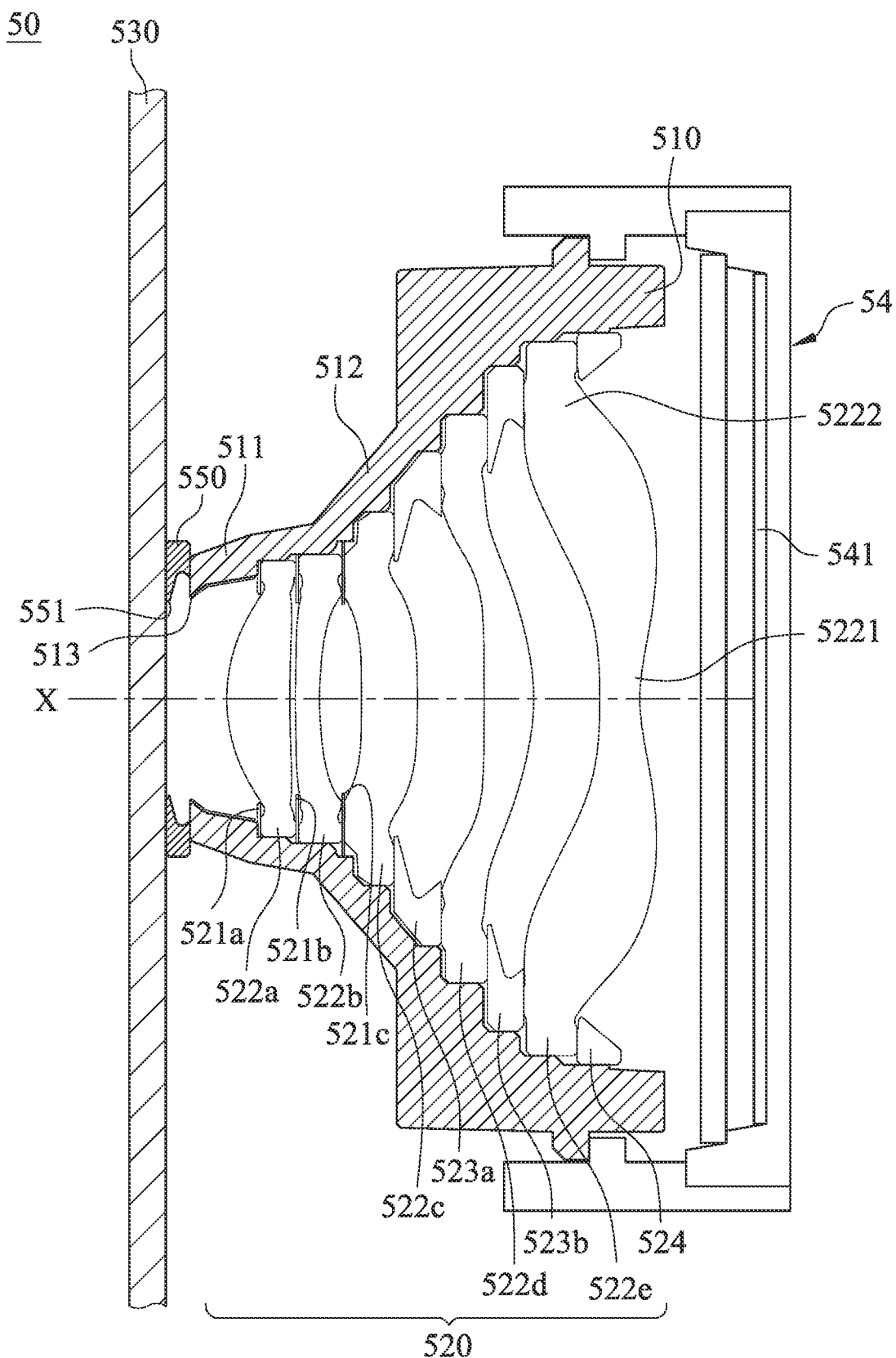
FIG. 5A is a schematic view of a camera module according to the 5th embodiment of the present disclosure.
Figure 5B:
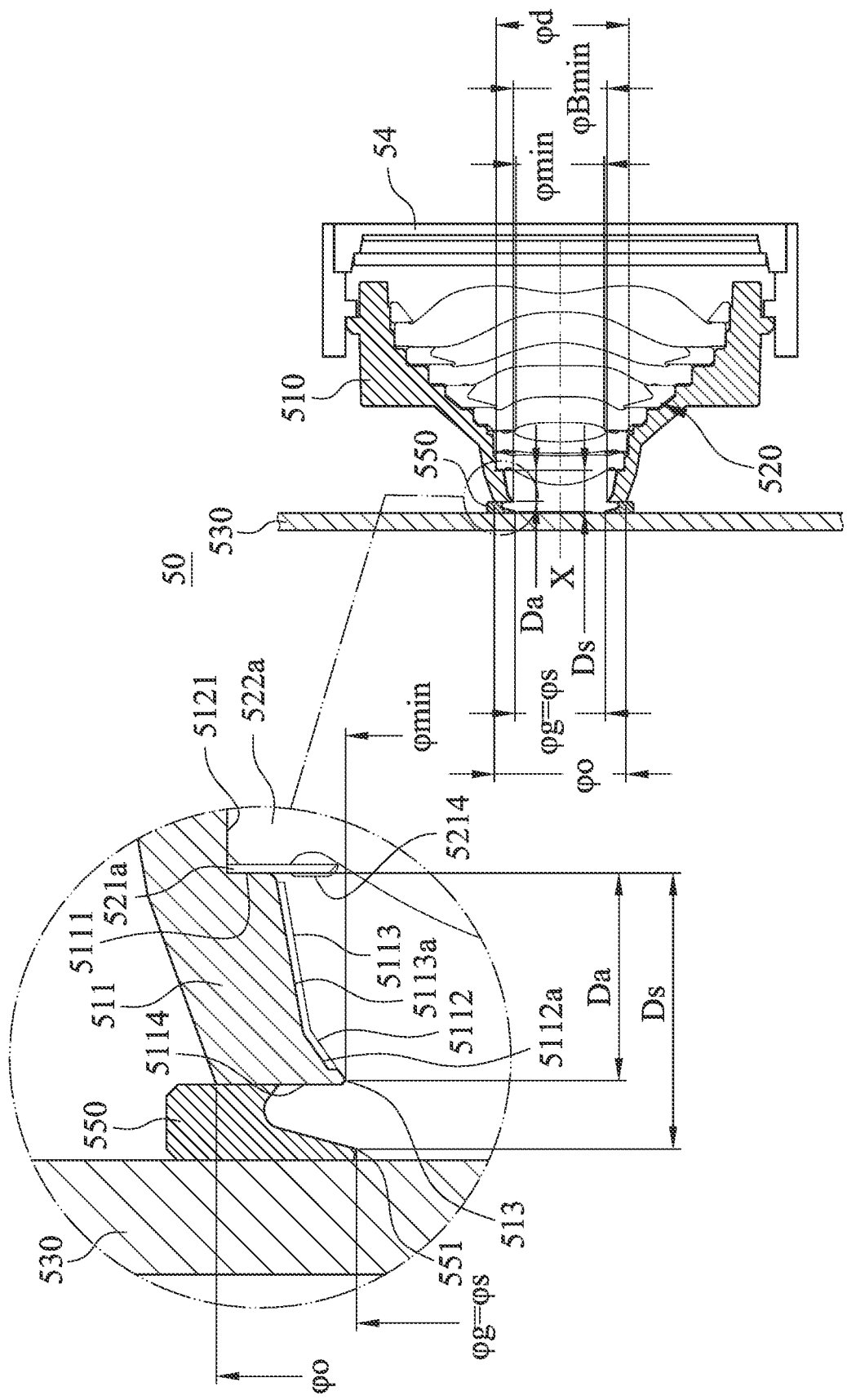
FIG. 5B is a partially enlarged view of the camera module according to the 5th embodiment in FIG. 5A.

FIG. 5A is a schematic view of a camera module 50 according to the 5th embodiment of the present disclosure. FIG. 5B is a partially enlarged view of the camera module 50 according to the 5th embodiment in FIG. 5A. In FIGS. 5A and 5B, the camera module 50 includes an imaging lens assembly module (its reference numeral is omitted) and an image sensor module 54. The imaging lens assembly module has an optical axis X, and includes a lens barrel 510, an optical element set 520, a transparent flat plate 530 and an aperture element 550. The image sensor module 54 includes an image sensor 541. In detail, the transparent flat plate 530 is located on an object side of the imaging lens assembly module. The imaging lens assembly module is disposed on the image sensor module 54, and the imaging lens assembly module can be connected to the image sensor module 54 via the lens barrel 510. The image sensor 541 of the image sensor module 54 is located on an image side of the imaging lens assembly module. The lens barrel 510 of the imaging lens assembly module is disposed on an image side of the transparent flat plate 530, the aperture element 550 is disposed between the transparent flat plat 530 and the lens barrel 510, and the optical element set 520 is disposed in the lens barrel 510.

In detail, the lens barrel 510 includes an object-side portion 511, a tubular portion 512 and a tip-end minimal aperture 513. Both of the object-side portion 511 and the tubular portion 512 surround the optical axis X. The tubular portion 512 is connected to the object-side portion 511, and extends to the image side of the lens barrel 510. The tip-end minimal aperture 513 is symmetrical about the optical axis X as a center, and the tip-end minimal aperture 513 is located on the object-side portion 511. The aperture element 550 includes an aperture opening 551, and the aperture opening 551 surrounds the optical axis X.

According to the 5th embodiment, the aperture opening 551 of the aperture element 550 is an aperture stop of the imaging lens assembly module for passing an imaging light and controlling the amount of incoming light of the imaging lens assembly module, and an opening diameter of the aperture opening 551 is an entrance pupil diameter of the imaging lens assembly module. Therefore, the reflection condition of non-imaging light can be decreased, and it is favorable for obtaining the compact size of the imaging lens assembly module.

The optical element set 520 includes a plurality of light blocking elements and at least one optical lens element, wherein each of the light blocking elements has an opening surrounding the optical axis X, the light blocking elements include at least one light blocking sheet, and the optical element set 520 can further include a plurality of spacers and a retainer, but is not limited thereof. In detail, according to the 5th embodiment, the optical element set 520, in order from an object side to an image side, includes a light blocking sheet 521a, a first optical lens element 522a, a light blocking sheet 521b, a second optical lens element 522b, a light blocking sheet 521c, a third optical lens element 522c, a spacer 523a, a fourth optical lens element 522d, a spacer 523b, a fifth optical lens element 522e and a retainer 524. Therefore, it is favorable for decreasing the reflection condition of non-imaging light of the imaging lens assembly module according to the 5th embodiment.

Furthermore, the object-side portion 511 includes a first assembling surface 5111, a first reversing inclined surface 5112, a second reversing inclined surface 5113 and an object-side outer surface 5114. The first assembling surface 5111 faces toward the image side of the lens barrel 510. The first reversing inclined surface 5112 is gradually enlarged from the tip-end minimal aperture 513 to the image side of the lens barrel 510. That is, a diameter of the first reversing inclined surface 5112 is gradually increased from the tip-end minimal aperture 513 to the image side of the lens barrel 510, and the first reversing inclined surface 5112 is not contacted with the optical element set 520 (that is, the first reversing inclined surface 5112 is not directly contacted with the optical element set 520). The second reversing inclined surface 5113 is gradually enlarged from the tip-end minimal aperture 513 to the image side of the lens barrel 510. That is, a diameter of the second reversing inclined surface 5113 is gradually increased from the tip-end minimal aperture 513 to the image side of the lens barrel 510, and an angle between the second reversing inclined surface 5113 and the optical axis X is smaller than an angle between the first reversing inclined surface 5112 and the optical axis X. The tubular portion 512 includes a plurality of second assembling surfaces 5121, wherein all of the second assembling surfaces 5121 face toward the optical axis X, and the second assembling surfaces 5121 are arranged in order from an object side of the lens barrel 510 to the image side of the lens barrel 510, and have different diameters.

The light blocking sheet 521a includes an object-side surface, an image-side surface and an inner opening surface (its reference numeral is omitted, please refer to FIG. 1D according to the 1st embodiment), wherein the object-side surface is disposed on the first assembling surface 5111, and the inner opening surface is connected to the object-side surface and the image-side surface and corresponding to the tip-end minimal aperture 513. The fifth optical lens element 522e, in order from the optical axis X to a peripheral region of the fifth optical lens element 522e, includes an optical effective portion 5221 and a peripheral portion 5222. The peripheral portion 5222 surrounds the optical effective portion 5221, and is disposed on one of the second assembling surfaces 5121. According to the 5th embodiment, it should be mentioned that each light blocking sheet (includes the light blocking sheets 521b, 521c) of the optical element set 520 includes the object-side surface, the image-side surface and the inner opening surface, and the disposition thereof is the same as the light blocking sheet 521a. Also, each optical lens element (includes the first lens element 522a, the second lens element 522b, the third lens element 522c, the fourth lens element 522d) includes the optical effective portion and the peripheral portion, and the disposition thereof is the same as the fifth lens element 522e. Hence, only the light blocking sheet 521a and the fifth optical lens element 522e are described herein.

Furthermore, the inner opening surface of the light blocking sheet can be a conical surface, and be gradually enlarged from an image side of the optical element set 520 to an object side of the optical element set 520. In FIG. 5B, the light blocking sheet 521a can further include a matt film layer 5214, and the matt film layer 5214 is disposed on at least one portion of the object-side surface and the inner opening surface of the light blocking sheet 521a, wherein the matt film layer 5214 can be an anti-reflection film or a black ink, but is not limited thereof.

The aperture element 550 is disposed between the transparent flat plate 530 and the first assembling surface 5111, and the aperture element 550 is contacted with the transparent flat plate 530. In detail, the aperture element 550 is disposed between the transparent flat plate 530 and the object-side outer surface 5114, but is not limited thereto. According to the 5th embodiment, the aperture element 550 is a metal spacer, but is not limited thereof. Therefore, the disposition of the aperture element 550 is favorable for obtaining the compact size of the imaging lens assembly module.

Moreover, the tip-end minimal aperture 513, the first reversing inclined surface 5112 and the second reversing inclined surface 5113 are arranged in order from the object side of the lens barrel 510 to the image side of the lens barrel 510. Therefore, a draft angle of injection molding can be provided, and an effect of decreasing a formation of the stray light can be kept.

In detail, the first reversing inclined surface 5112 includes a plurality of first grooving structures 5112a, and the second reversing inclined surface 5113 includes a plurality of second grooving structures 5113a. The first grooving structures 5112a and the second grooving structures 5113a extend to a direction away from the tip-end minimal aperture 513, and the first grooving structures 5112a and the second grooving structures 5113a are regularly disposed along a circular direction of the optical axis X. In detail, according to the 5th embodiment, a number of the first grooving structures 5112a is N1, and N1=180; a number of the second grooving structures 5113a is N2, and N2=180. Therefore, structural densities of the first reversing inclined surface 5112 and the second reversing inclined surface 5113 are provided.

In FIG. 5B, according to the 5th embodiment, every definition of ever parameter is the same as the 1st embodiment and the 2nd embodiment, and will not be described again herein. Please refer to the Table 5.

TABLE 5

| 5th embodiment | | | |
|---|---|---|---|
| Da (mm) | 0.547 | φd (mm) | 2.360 |
| Ds (mm) | 0.727 | φmin (mm) | 1.560 |
| φBmin (mm) | 1.657 | φBmin/φd | 0.702 |

TABLE 5-continued

| 5th embodiment | | | |
|---|---|---|---|
| φs (mm) | 1.600 | φs/φmin | 1.026 |
| φo (mm) | 2.338 | φg/φmin | 1.026 |
| φg (mm) | 1.600 | | |

According to the 5th embodiment, it should be mentioned that φg=φs.

6th Embodiment

Figure 6A:
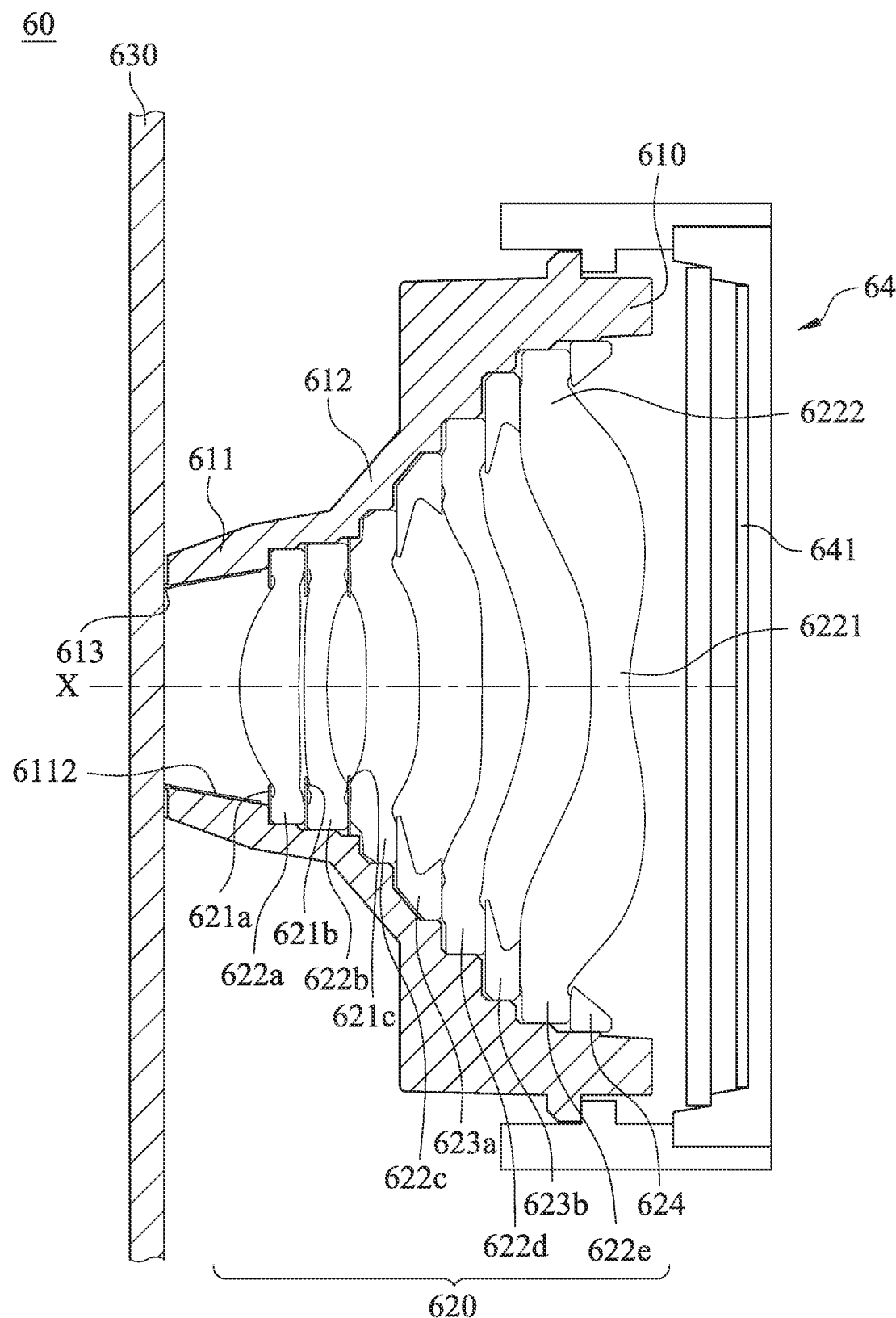
FIG. 6A is a schematic view of a camera module according to the 6th embodiment of the present disclosure.
Figure 6B:
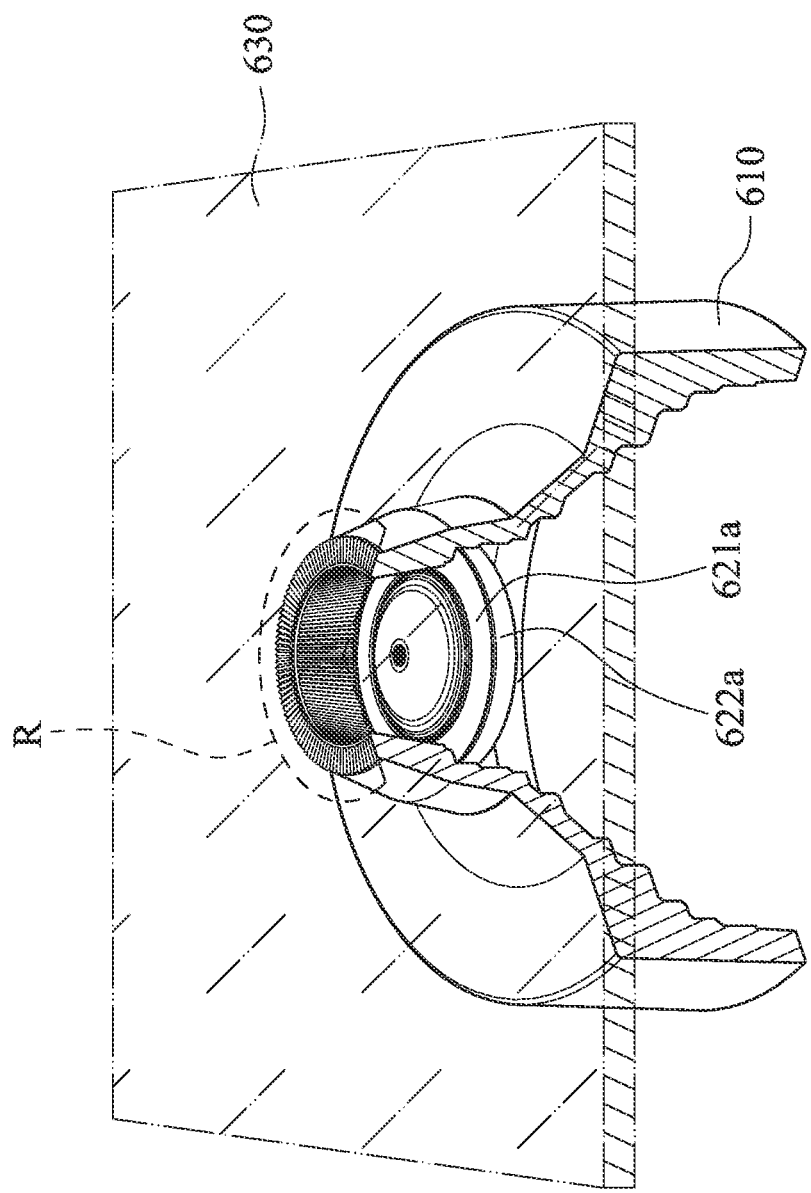
FIG. 6B is a schematic view of a lens barrel and a transparent flat plate of an imaging lens assembly module according to the 6th embodiment in FIG. 6A.
Figure 6C:
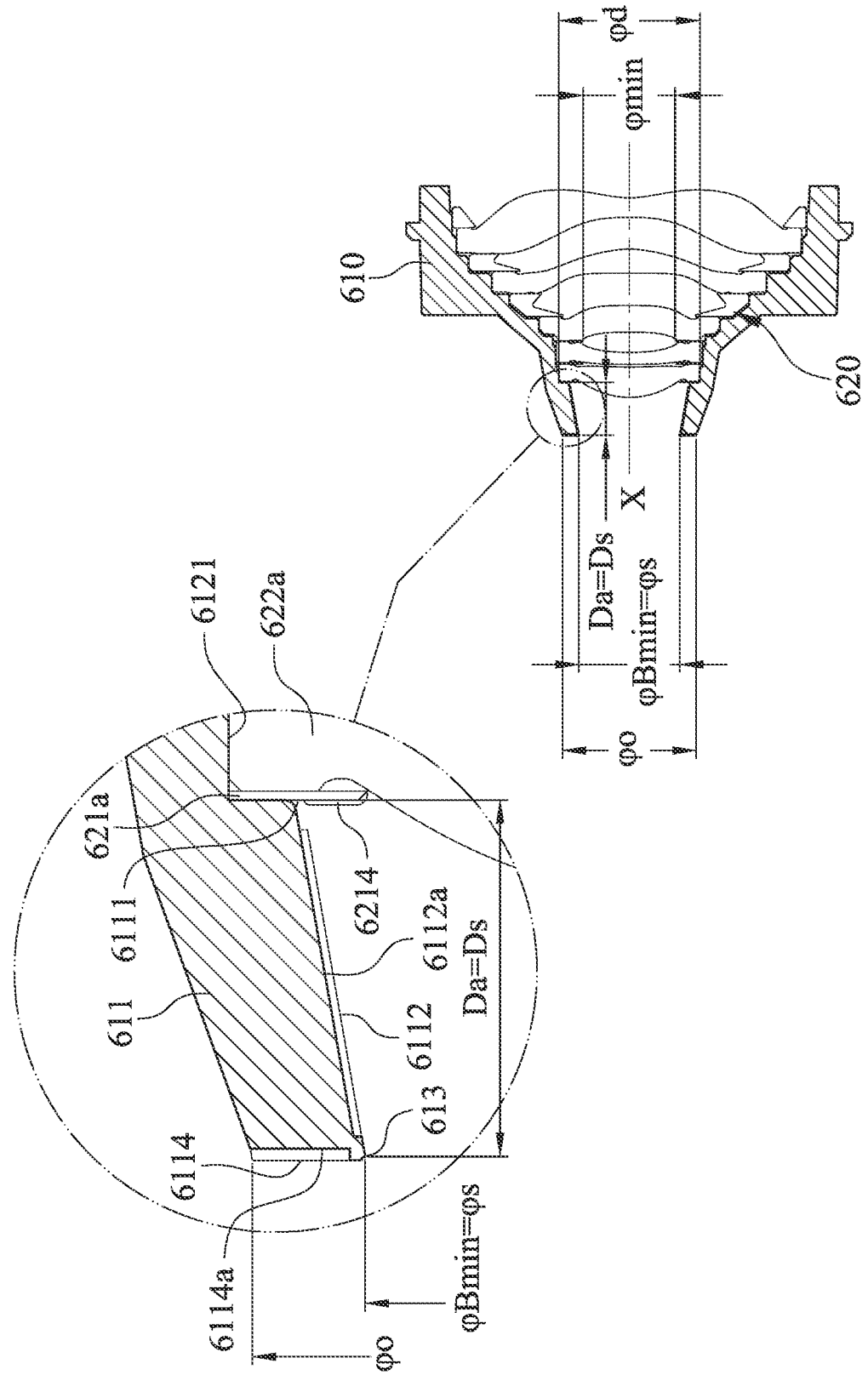
FIG. 6C is a partially enlarged view of the imaging lens assembly module according to the 6th embodiment in FIG. 6A.

FIG. 6A is a schematic view of a camera module 60 according to the 6th embodiment of the present disclosure. FIG. 6B is a schematic view of a lens barrel 610 and a transparent flat plate 630 of an imaging lens assembly module according to the 6th embodiment in FIG. 6A. FIG. 6C is a partially enlarged view of the imaging lens assembly module according to the 6th embodiment in FIG. 6A. In FIGS. 6A to 6C, the camera module 60 includes an imaging lens assembly module (its reference numeral is omitted) and an image sensor module 64. The imaging lens assembly module has an optical axis X, and includes a lens barrel 610, an optical element set 620 and a transparent flat plate 630. The image sensor module 64 includes an image sensor 641. In detail, the transparent flat plate 630 is located on an object side of the imaging lens assembly module. The imaging lens assembly module is disposed on the image sensor module 64, and the imaging lens assembly module can be connected to the image sensor module 64 via the lens barrel 610. The image sensor 641 of the image sensor module 64 is located on an image side of the imaging lens assembly module. The lens barrel 610 of the imaging lens assembly module is disposed on an image side of the transparent flat plate 630, and the optical element set 620 is disposed in the lens barrel 610.

In detail, the lens barrel 610 includes an object-side portion 611, a tubular portion 612 and a tip-end minimal aperture 613. Both of the object-side portion 611 and the tubular portion 612 surround the optical axis X. The tubular portion 612 is connected to the object-side portion 611, and extends to the image side of the lens barrel 610. The tip-end minimal aperture 613 is symmetrical about the optical axis X as a center, and the tip-end minimal aperture 613 is located on the object-side portion 611.

According to the 6th embodiment, the tip-end minimal aperture 613 of the lens barrel 610 is an aperture stop of the imaging lens assembly module for passing an imaging light and controlling the amount of incoming light of the imaging lens assembly module, and an opening diameter of the tip-end minimal aperture 613 is an entrance pupil diameter of the imaging lens assembly module. Therefore, the reflection condition of non-imaging light can be decreased, and it is favorable for obtaining the compact size of the imaging lens assembly module.

The optical element set 620 includes a plurality of light blocking elements and at least one optical lens element, wherein each of the light blocking elements has an opening surrounding the optical axis X, the light blocking elements include at least one light blocking sheet, and the optical element set 620 can further include a plurality of spacers and a retainer, but is not limited thereof. In detail, according to the 6th embodiment, the optical element set 620, in order from an object side to an image side, includes a light blocking sheet 621a, a first optical lens element 622a, a light blocking sheet 621b, a second optical lens element 622b, a light blocking sheet 621c, a third optical lens element 622c, a spacer 623a, a fourth optical lens element 622d, a spacer 623b, a fifth optical lens element 622e and a retainer 624. Therefore, it is favorable for decreasing the reflection condition of non-imaging light of the imaging lens assembly module according the 6th embodiment.

Furthermore, the object-side portion 611 includes a first assembling surface 6111, a first reversing inclined surface 6112 and an object-side outer surface 6114. The first assembling surface 6111 faces toward the image side of the lens barrel 610. The first reversing inclined surface 6112 is gradually enlarged from the tip-end minimal aperture 613 to the image side of the lens barrel 610. That is, a diameter of the first reversing inclined surface 6112 is gradually increased from the tip-end minimal aperture 613 to the image side of the lens barrel 610, and the first reversing inclined surface 6112 is not contacted with the optical element set 620 (that is, the first reversing inclined surface 6112 is not directly contacted with the optical element set 620). The tubular portion 612 includes a plurality of second assembling surfaces 6121, wherein all of the second assembling surfaces 6121 face toward the optical axis X, and the second assembling surfaces 6121 are arranged in order from an object side of the lens barrel 610 to the image side of the lens barrel 610, and have different diameters.

The light blocking sheet 621a includes an object-side surface, an image-side surface and an inner opening surface (its reference numeral is omitted, please refer to FIG. 1D according to the 1st embodiment), wherein the object-side surface is disposed on the first assembling surface 6111, and the inner opening surface is connected to the object-side surface and the image-side surface and corresponding to the tip-end minimal aperture 613. The fifth optical lens element 622e, in order from the optical axis X to a peripheral region of the fifth optical lens element 622e, includes an optical effective portion 6221 and a peripheral portion 6222. The peripheral portion 6222 surrounds the optical effective portion 6221, and is disposed on one of the second assembling surfaces 6121. According to the 6th embodiment, it should be mentioned that each light blocking sheet (includes the light blocking sheets 621b, 621c) of the optical element set 620 includes the object-side surface, the image-side surface and the inner opening surface, and the disposition thereof is the same as the light blocking sheet 621a. Also, each optical lens element (includes the first lens element 622a, the second lens element 622b, the third lens element 622c, the fourth lens element 622d) includes the optical effective portion and the peripheral portion, and the disposition thereof is the same as the fifth lens element 622e. Hence, only the light blocking sheet 621a and the fifth optical lens element 622e are described herein.

Furthermore, the inner opening surface of the light blocking sheet can be a conical surface, and be gradually enlarged from an image side of the optical element set 620 to an object side of the optical element set 620. In FIG. 6B, the light blocking sheet 621a can further include a matt film layer 6214, and the matt film layer 6214 is disposed on at least one portion of the object-side surface and the inner opening surface of the light blocking sheet 621a, wherein the matt film layer 6214 can be an anti-reflection film or a black ink, but is not limited thereof.

Moreover, the tip-end minimal aperture 613 and the first reversing inclined surface 6112 are arranged in order from the object side of the lens barrel 610 to the image side of the lens barrel 610. Therefore, a draft angle of injection molding can be provided, and an effect of decreasing a formation of the stray light can be kept.

In FIG. 6C, the object-side outer surface 6114 faces toward the object side of the lens barrel 610, and the object-side outer surface 6114 and the transparent flat plate 630 are connected to each other. That is, the object-side outer surface 6114 and an image side of the transparent flat plate 630 are located on a same surface. Therefore, it is favorable for preventing the stray light from large angle of the transparent flat plate 630 passing into the lens barrel 610. In detail, an axial distance between the transparent flat plate 630 and the tip-end minimal aperture 613 is smaller than an axial distance between the tip-end minimal aperture 613 and the first assembling surface 6111. The transparent flat plate 630 can be a glass substrate, a display panel or a protecting board, but is not limited thereto. Therefore, according to the 6th embodiment, a manufacturability of a lens assembly under display is provided. Furthermore, according to the 6th embodiment, the axial distance between the transparent flat plate 630 and the aperture stop is zero, that is, the aperture stop is contacted with the transparent flat plate 630 (that is, the aperture stop is directly contacted with the transparent flat plate 630).

Figure 6D:
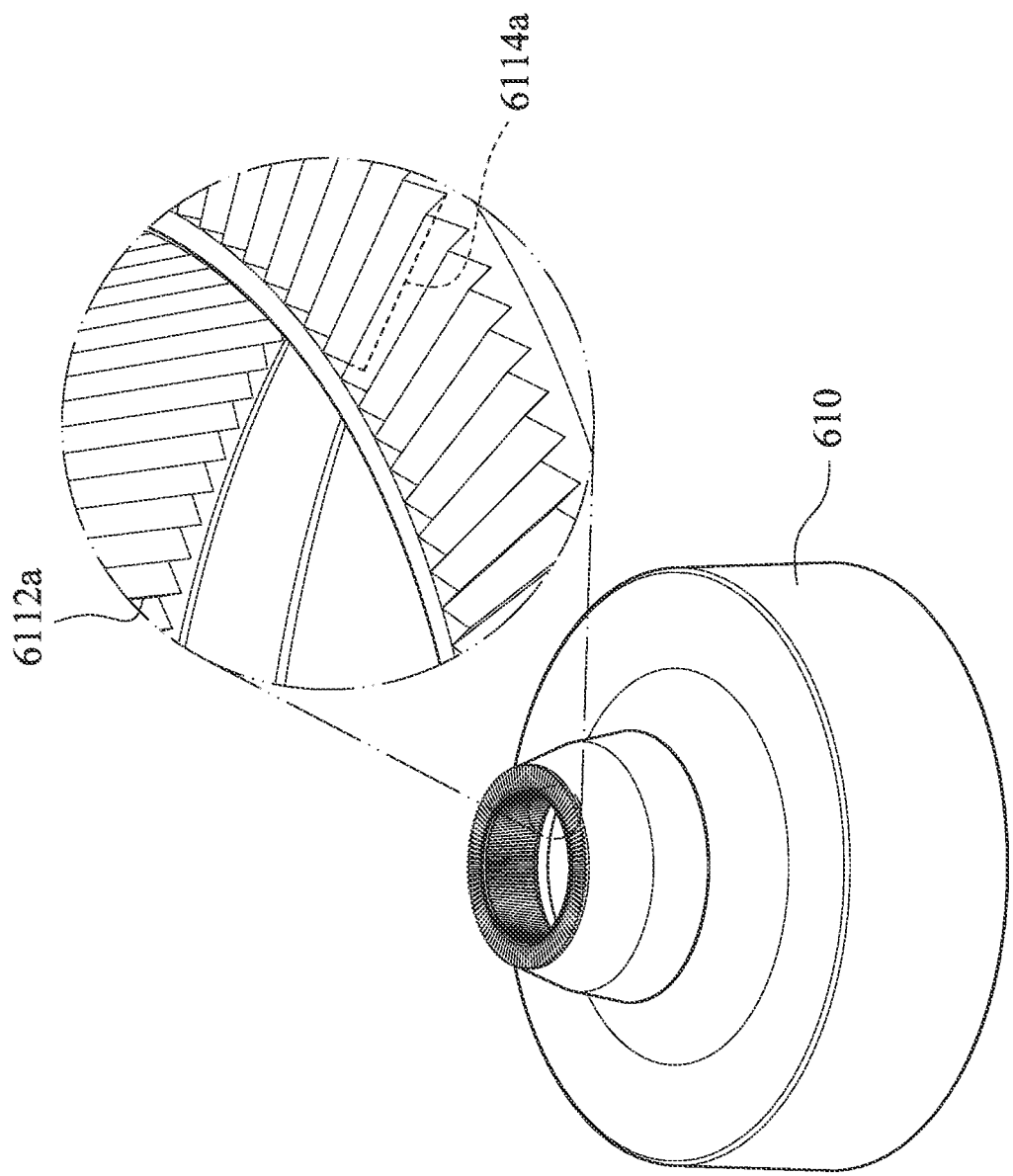
FIG. 6D is a three-dimensional view of the lens barrel according to the 6th embodiment in FIG. 6A.

FIG. 6D is a three-dimensional view of the lens barrel 610 according to the 6th embodiment in FIG. 6A. In detail, the first reversing inclined surface 6112 includes a plurality of first grooving structures 6112a and the object-side outer surface 6114 includes a plurality of third grooving structures 6114a. The first grooving structures 6112a extends from the object side of the lens barrel 610 to the image side of the lens barrel 610, the third grooving structures 6114a extends to a direction away from the tip-end minimal aperture 613, and the first grooving structures 6112a and the third grooving structures 6114a are regularly disposed along a circular direction of the optical axis X. In detail, according to the 6th embodiment, a number of the first grooving structures 6112a is N1, and N1=144; a number of the third grooving structures 6114a is N3, and N3=120. Therefore, structural densities of the first reversing inclined surface 6112 and the object-side outer surface 6114 are provided.

Furthermore, in FIGS. 6C and 6D, the third grooving structures 6114a are recessed from the reference surface R to an inside of the lens barrel 610. Hence, the object-side outer surface 6114 is connected to the transparent flat plate 630, and the third grooving structures 6114a cannot be contacted with the transparent flat plate 630. Therefore, the possibility of the non-imaging light irradiating to the imaging lens assembly module can be decreased via a disposition of the third grooving structures 6114a close to the aperture stop of the imaging lens assembly module.

In FIG. 6B, according to the 6th embodiment, every definition of ever parameter is the same as the 1st embodiment and the 2nd embodiment, and will not be described again herein. Please refer to the Table 6.

TABLE 6

| 6th embodiment | | | |
|---|---|---|---|
| Da (mm) | 0.900 | φd (mm) | 2.400 |
| Ds (mm) | 0.900 | φmin (mm) | 1.560 |
| φBmin (mm) | 1.712 | φBmin/φd | 0.713 |
| φs (mm) | 1.712 | φs/φmin | 1.097 |
| φo (mm) | 2.281 | | |

According to the 6th embodiment, it should be mentioned that Da=Ds, and φBmin=φs.

7th Embodiment

Figure 7A:
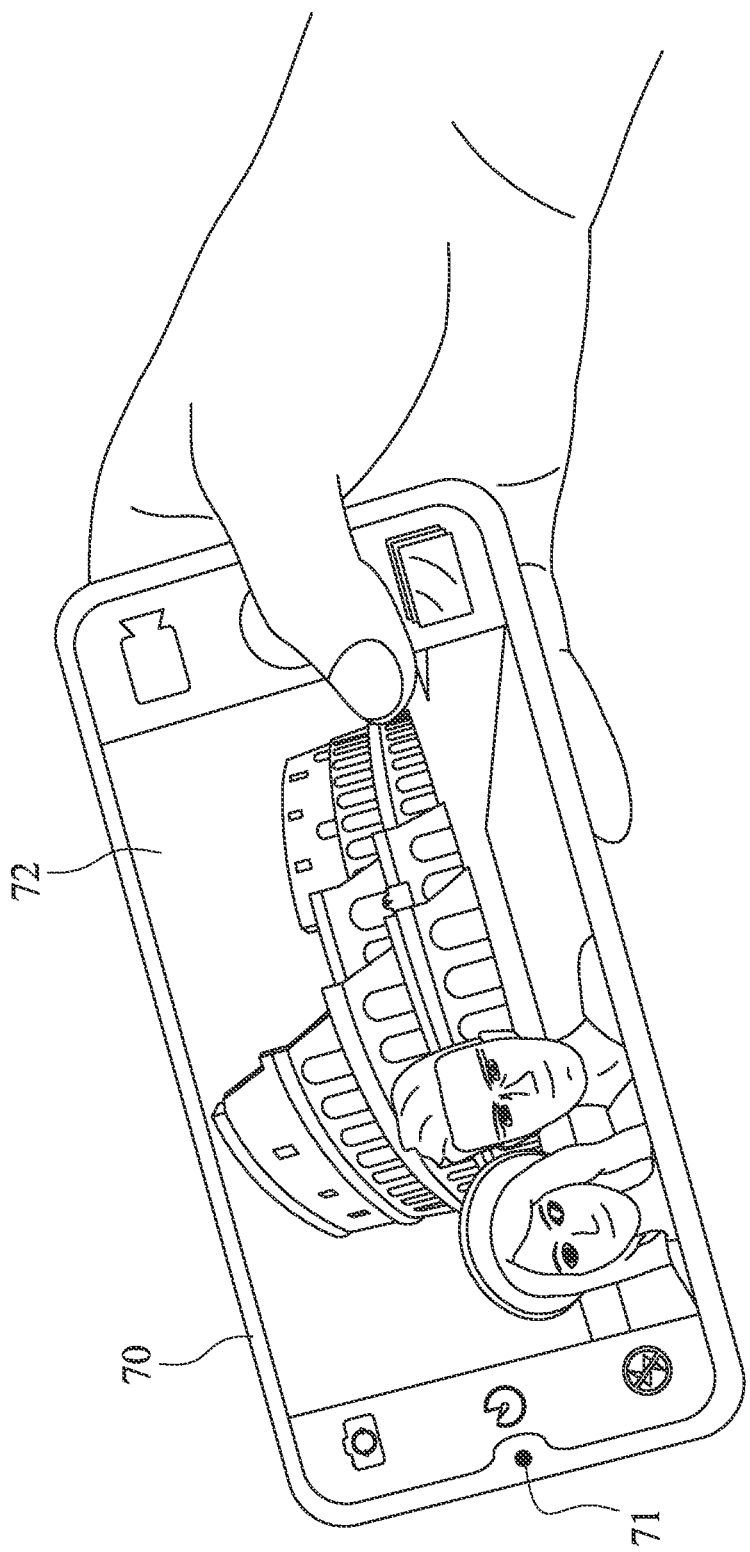
FIG. 7A is a schematic view of an electronic device according to the 7th embodiment of the present disclosure.

FIG. 7A is a schematic view of an electronic device 70 according to the 7th embodiment of the present disclosure.

Figure 7B:
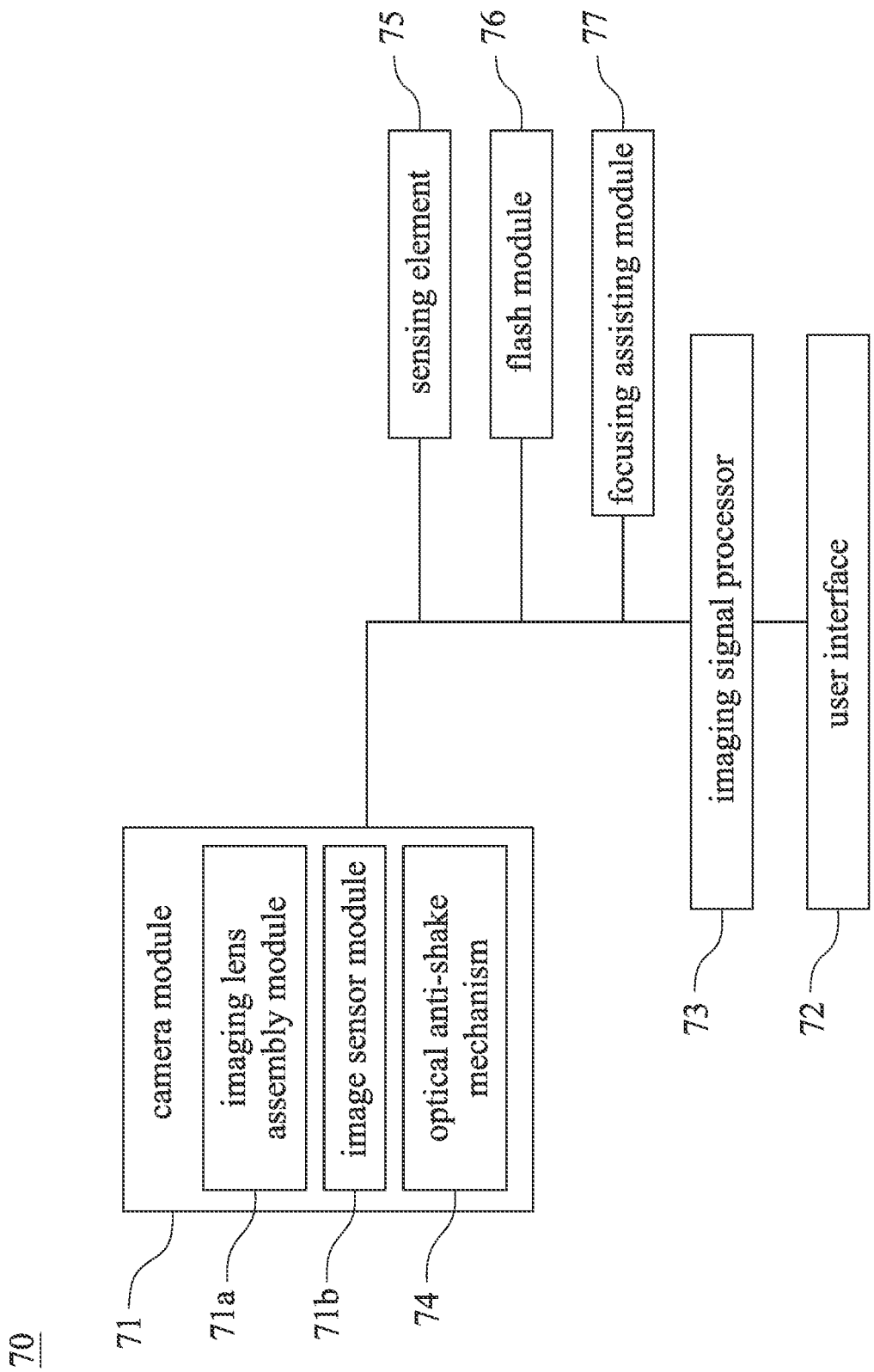
FIG. 7B is a block diagram of the electronic device according to the 7th embodiment in FIG. 7A.

FIG. 7B is a block diagram of the electronic device 70 according to the 7th embodiment in FIG. 7A. In FIGS. 7A and 7B, the electronic device 70 is a smart phone, and includes a camera module 71 and a user interface 72. The camera module 71 according to the 7th embodiment is disposed on an area of side of the user interface 72, wherein the user interface 72 can be a touch screen or a display screen, but is not limited thereto. The camera module 71 can be one of the camera modules according to the aforementioned 1st embodiment to the 6th embodiment, and the camera module 71 includes an imaging lens assembly module 71*a* and an image sensor module 71*b*, but is not limited thereto.

Moreover, users enter a shooting mode via the user interface 72 of the electronic device 70. At this moment, the imaging light is gathered on the image sensor module 71*b* via the imaging lens assembly module 71*a*, and an electronic signal about an image is output to an image signal processor (ISP) 73.

To meet a specification of the camera module 71 of the electronic device 70, the electronic device 70 can further include an optical anti-shake mechanism 74, which can be an optical image stabilization (OIS). Furthermore, the electronic device 70 can further include at least one auxiliary optical element (its reference numeral is omitted) and at least one sensing element 75. According to the 7th embodiment, the auxiliary optical element is a flash module 76 and a focusing assisting module 77. The flash module 76 can be for compensating a color temperature, and the focusing assisting module 77 can be an infrared distance measurement component, a laser focus module, etc. The sensing element 75 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 74 disposed on the imaging lens assembly module 71*a* of the electronic device 70 can be enhanced to achieve the superior image quality. Furthermore, the electronic device 70 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 70 can further include, but not be limited to, a display, a control unit, a storage unit, a random access memory (RAM), a read-only memory (ROM), or the combination thereof.

Figure 7C:
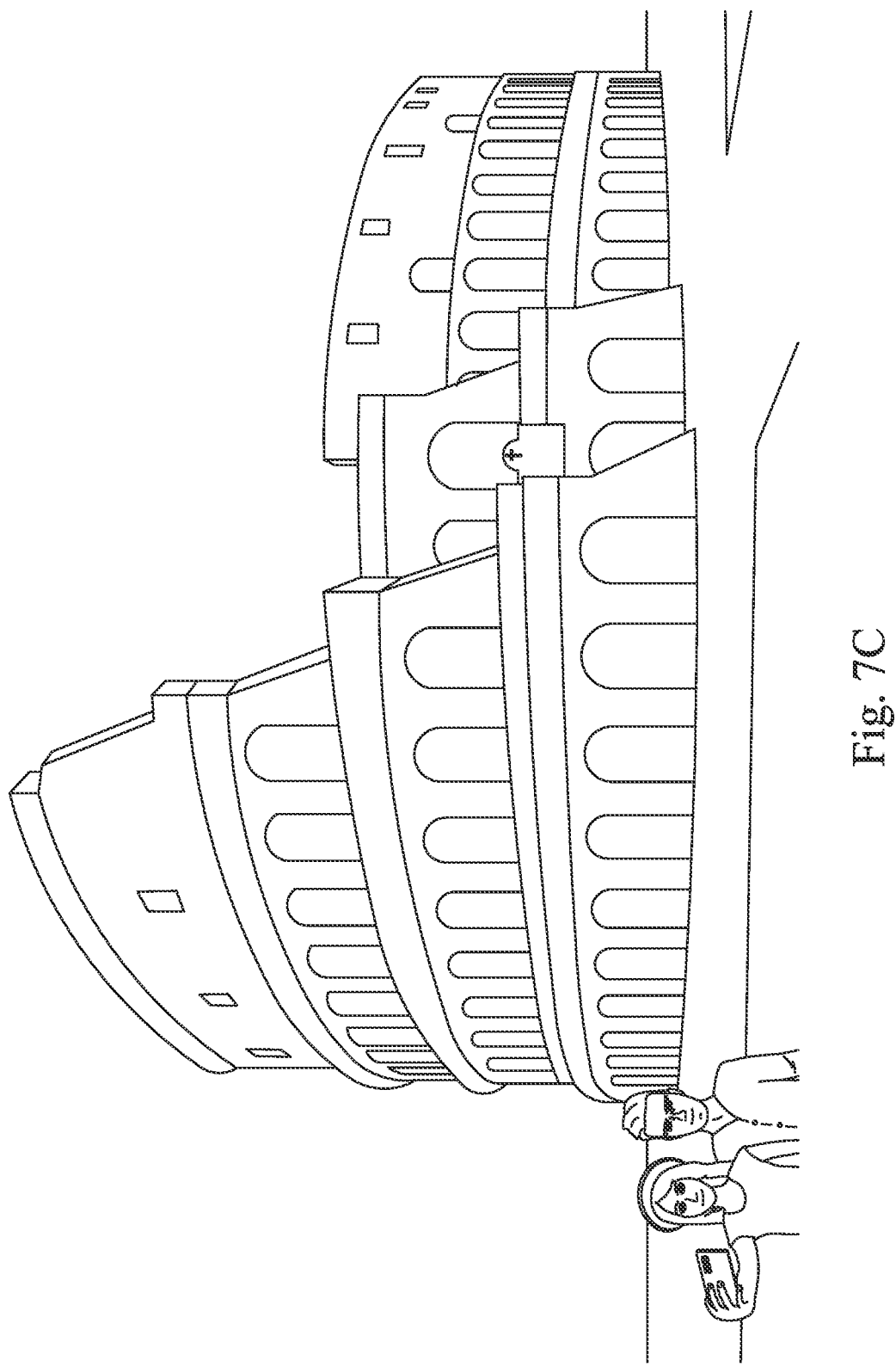
FIG. 7C is a schematic view of selfie scene according to the 7th embodiment in FIG. 7A.
Figure 7D:
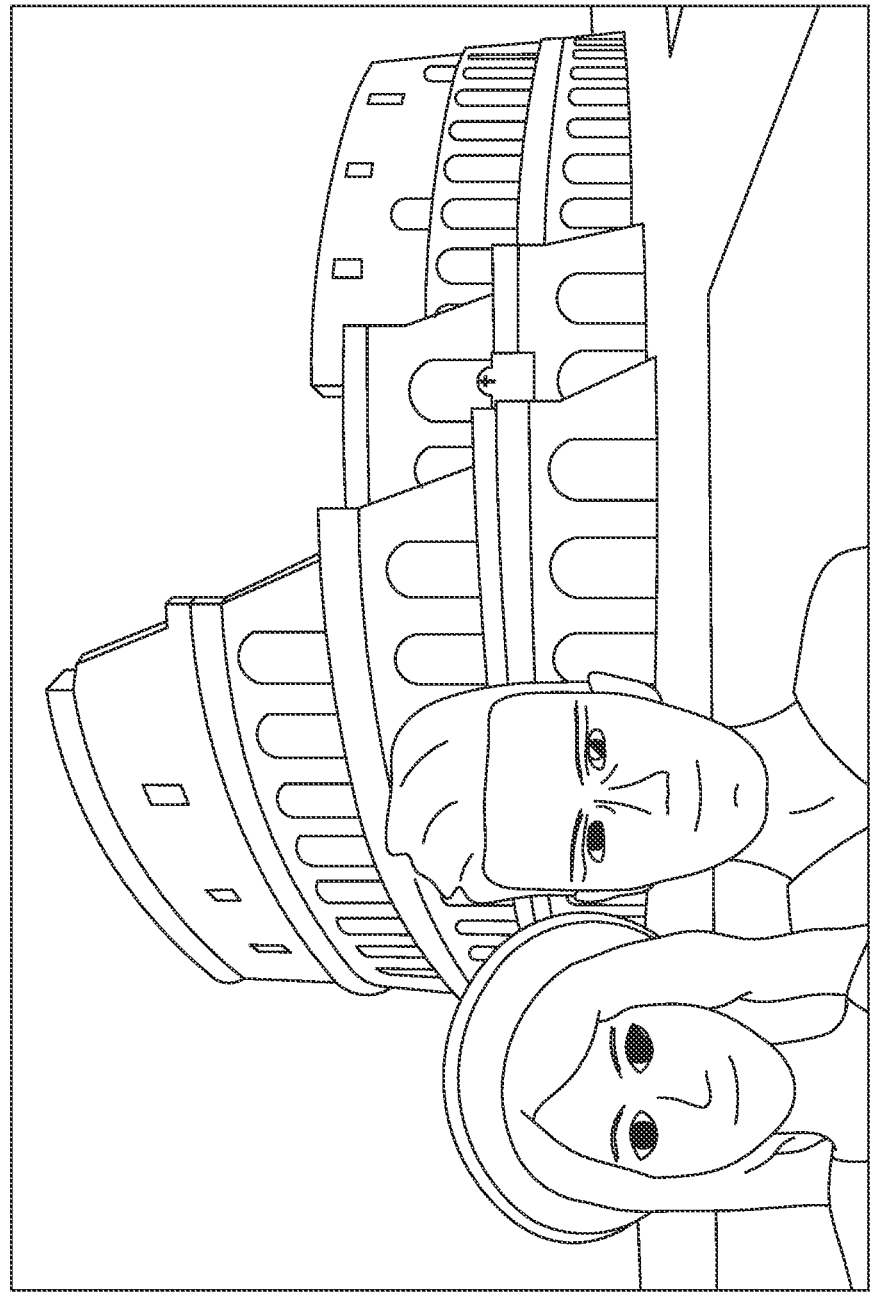
FIG. 7D is a schematic view of a captured image according to the 7th embodiment in FIG. 7A.

FIG. 7C is a schematic view of selfie scene according to the 7th embodiment in FIG. 7A. FIG. 7D is a schematic view of a captured image according to the 7th embodiment in FIG. 7A. In FIGS. 7A to 7D, the camera module 71 and the user interface 72 face toward the users. When proceeding selfie or live streaming, the users can watch a captured image and operate an interface at the same time, and the capture image as FIG. 7D can be obtained after shooting. Therefore, better shooting experience can be provided via the imaging lens assembly module 71*a* of the present disclosure.

8th Embodiment

Figure 8:
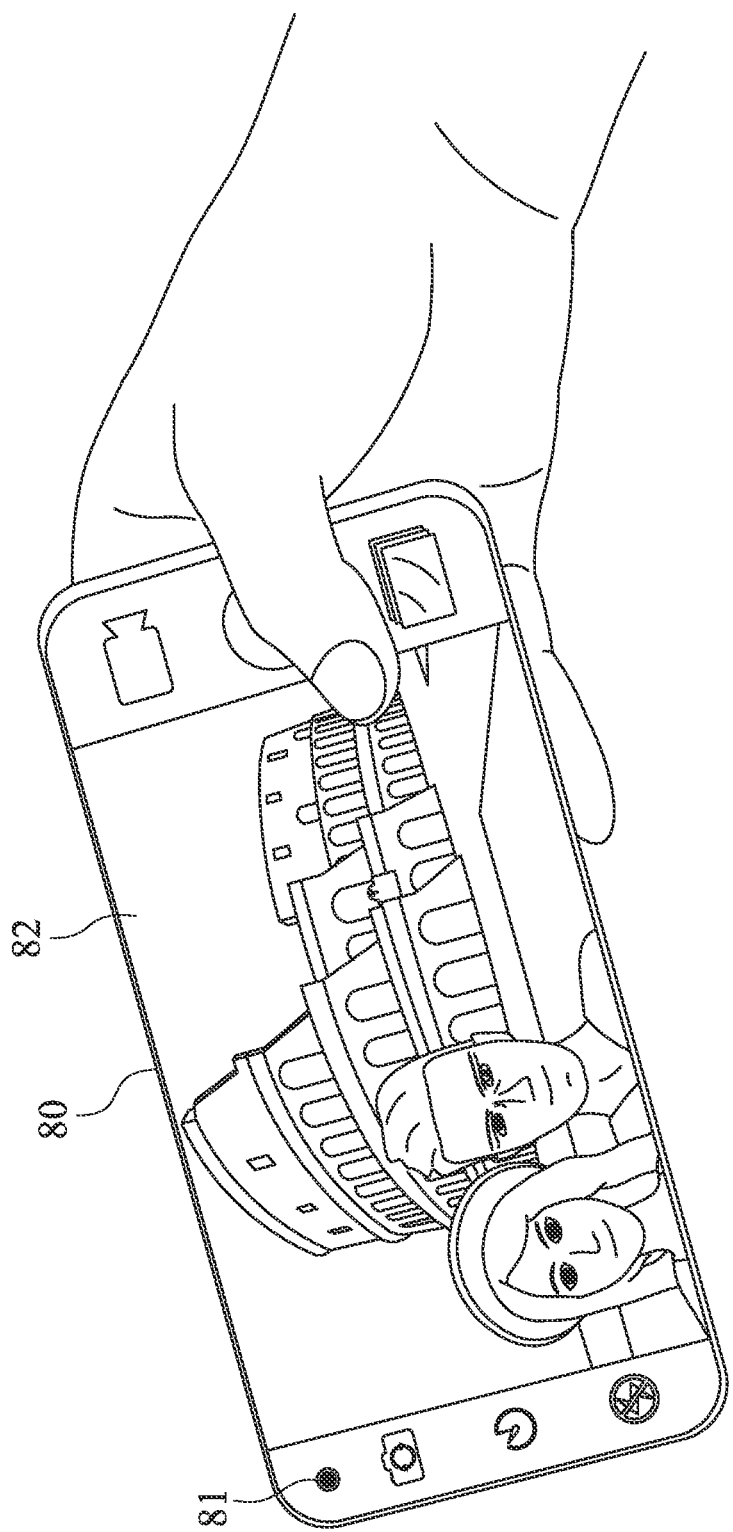
FIG. 8 is a schematic view of an electronic device according to the 8th embodiment of the present disclosure.

FIG. 8 is a schematic view of an electronic device 80 according to the 8th embodiment of the present disclosure. In FIG. 8, the electronic device 80 includes a camera module 81 and a user interface 82. The camera module 81 according to the 8th embodiment is disposed below an area of the user interface 82, wherein the user interface 82 can be a touch screen or a display screen, but is not limited thereto. The camera module 81 can be one of the camera modules according to the aforementioned 1st embodiment to the 6th embodiment, and the camera module 81 includes an imaging lens assembly module (not shown) and an image sensor module (not shown), but is not limited thereto.

In FIG. 8, the camera module 81 and the user interface 82 face toward the users. When proceeding selfie or live streaming, the users can watch a captured image and operate an interface at the same time. Therefore, better shooting experience can be provided via the imaging lens assembly module as a disposition of a lens assembly under display of the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly module, which has an optical axis, comprising:
   a transparent flat plate;
   a lens barrel disposed on an image side of the transparent flat plate, and comprising:
      an object-side portion surrounding the optical axis, and comprising a first assembling surface, the first assembling surface facing toward an image side of the lens barrel;
      a tubular portion surrounding the optical axis, the tubular portion connected to the object-side portion and extending to the image side of the lens barrel, and comprising a plurality of second assembling surfaces, wherein all of the second assembling surfaces face toward the optical axis, the second assembling surfaces are arranged from an object side of the lens barrel to the image side of the lens barrel in order of increasing a distance from the optical axis, and have different diameters; and
      a tip-end minimal aperture being a symmetrical circle about the optical axis as a center, and the tip-end minimal aperture located on the object-side portion; and
   an optical element set disposed in the lens barrel, comprising:
      a plurality of light blocking elements, each of the light blocking elements having an opening surrounding the optical axis, the light blocking elements comprising at least one light blocking sheet, and the at least one light blocking sheet comprising:

an object-side surface disposed on the first assembling surface;

an image-side surface; and an inner opening surface connected to the object-side surface and the image-side surface, and corresponding to the tip-end minimal aperture; and at least one optical lens element, in order of increasing a distance from the optical axis to a peripheral region of the at least one optical lens element, comprising:

an optical effective portion; and a peripheral portion surrounding the optical effective portion, and disposed on one of the second assembling surfaces; and an aperture element comprising an aperture opening surrounding the optical axis, and the aperture element disposed between the transparent flat plate and the first assembling surface;

wherein the aperture opening of the aperture element is an aperture stop of the imaging lens assembly module;

wherein an axial distance between the aperture stop and the first assembling surface is Ds, an opening diameter of the tip-end minimal aperture is $\varphi Bmin$, a diameter of one of the second assembling surfaces closest to the object side of the lens barrel is $\varphi d$, and the following conditions are satisfied:

$$0.25 \text{ mm} < Ds < 1.4 \text{ mm; and}$$

$$0.6 < \varphi Bmin/\varphi d < 1.0.$$

2. The imaging lens assembly module of claim 1, wherein the object-side portion of the lens barrel comprises a first reversing inclined surface gradually enlarged from the tip-end minimal aperture to the image side of the lens barrel, and the first reversing inclined surface is not contacted with the optical element set.

3. The imaging lens assembly module of claim 2, wherein the first reversing inclined surface comprises a plurality of first grooving structures extending to a direction away from the tip-end minimal aperture, and the first grooving structures are regularly disposed along a circular direction of the optical axis.

4. The imaging lens assembly module of claim 3, wherein a number of the first grooving structures is N1, and the following condition is satisfied:

$$60 < N1 < 480.$$

5. The imaging lens assembly module of claim 2, wherein the object-side portion of the lens barrel further comprises a second reversing inclined surface gradually enlarged from the tip-end minimal aperture to the image side of the lens barrel, an angle between the second reversing inclined surface and the optical axis is smaller than an angle between the first reversing inclined surface and the optical axis, and the tip-end minimal aperture, the first reversing inclined surface and the second reversing inclined surface are arranged from the object side of the lens barrel to the image side of the lens barrel in order of increasing the distance from the optical axis.

6. The imaging lens assembly module of claim 5, wherein the second reversing inclined surface comprises a plurality of second grooving structures extending to a direction away from the tip-end minimal aperture, and the second grooving structures are regularly disposed along a circular direction of the optical axis.

7. The imaging lens assembly module of claim 6, wherein a number of the second grooving structures is N2, and the following condition is satisfied:

$$60 < N2 < 480.$$

8. The imaging lens assembly module of claim 7, wherein the number of the second grooving structure is N2, and the following condition is satisfied:

$$60 < N2 < 240.$$

9. The imaging lens assembly module of claim 1, wherein an axial distance between the transparent flat plate and the aperture opening is smaller than an axial distance between the aperture opening and the first assembling surface.

10. The imaging lens assembly module of claim 1, wherein the aperture element is contacted with the transparent flat plate.

11. The imaging lens assembly module of claim 1, wherein an opening diameter of the aperture opening is $\varphi g$, a minimum opening diameter of a minimum opening among the tip-end minimal aperture of the lens barrel and the openings of the light blocking elements is $\varphi min$, and the following condition is satisfied:

$$0.92 < \varphi g/\varphi min < 1.36.$$

12. A camera module, comprising:

the imaging lens assembly module of claim 1; and an image sensor module, wherein the imaging lens assembly module is disposed on the image sensor module, and the image sensor module comprises an image sensor.

13. An electronic device, comprising:

the camera module of claim 12.

14. An imaging lens assembly module, which has an optical axis, comprising:

a transparent flat plate;

a lens barrel disposed on an image side of the transparent flat plate, and comprising:

an object-side portion surrounding the optical axis, and comprising a first assembling surface, the first assembling surface facing toward an image side of the lens barrel;

a tubular portion surrounding the optical axis, the tubular portion connected to the object-side portion and extending to the image side of the lens barrel, and comprising a plurality of second assembling surfaces, wherein all of the second assembling surfaces face toward the optical axis, the second assembling surfaces are arranged from an object side of the lens barrel to the image side of the lens barrel in order of increasing an axial distance from the optical axis, and the second assembling surfaces have different diameters; and a tip-end minimal aperture being a symmetrical circle about the optical axis as a center, and the tip-end minimal aperture located on the object-side portion; and an optical element set disposed in the lens barrel, comprising:

a plurality of light blocking elements, each of the light blocking elements having an opening surrounding the optical axis, the light blocking elements comprising at least one light blocking sheet, and the at least one light blocking sheet comprising:

an object-side surface disposed on the first assembling surface;

an image-side surface; and an inner opening surface connected to the object-side surface and the image-side surface, and corresponding to the tip-end minimal aperture; and at least one optical lens element disposed on one of the second assembling surfaces;

wherein the imaging lens assembly module comprises an aperture stop disposed between the first assembling surface and the transparent flat plate, and an opening of the aperture stop is an entrance pupil of the imaging lens assembly module;

wherein a minimum opening among the tip-end minimal aperture of the lens barrel and the openings of the light blocking elements is located on an image side of the aperture stop;

wherein an axial distance between the aperture stop and the first assembling surface is Ds, an opening diameter of the tip-end minimal aperture is φBmin, a diameter of one of the second assembling surfaces closest to the object side of the lens barrel is φd, and the following conditions are satisfied:

0.25 mm<Ds<1.4 mm; and 0.6<φBmin/φd<1.0.

15. The imaging lens assembly module of claim 14, wherein an axial distance between the transparent flat plate and the aperture stop is smaller than the axial distance between the aperture stop and the first assembling surface.

16. The imaging lens assembly module of claim 15, wherein the axial distance between the transparent flat plate and the aperture stop is zero.

17. The imaging lens assembly module of claim 14, wherein the aperture stop is contacted with the transparent flat plate.

18. The imaging lens assembly module of claim 14, wherein the object-side portion of the lens barrel comprises a first reversing inclined surface and a second reversing inclined surface, the first reversing inclined surface and the second reversing inclined surface are gradually enlarged from the tip-end minimal aperture to the image side of the lens barrel, and the first reversing inclined surface and the second reversing inclined surface are not contacted with the optical element set.

19. The imaging lens assembly module of claim 18, wherein the second reversing inclined surface comprises a plurality of second grooving structures extending to a direction away from the tip-end minimal aperture, and the second grooving structures are regularly disposed along a circular direction of the optical axis.

20. The imaging lens assembly module of claim 19, wherein a number of the second grooving structures is N2, and the following condition is satisfied:

60<N2<480.

21. The imaging lens assembly module of claim 20, wherein the number of the second grooving structures is N2, and the following condition is satisfied:

60<N2<240.

22. The imaging lens assembly module of claim 14, wherein the object-side portion of the lens barrel comprises an object-side outer surface facing toward the object side of the lens barrel, and the object-side outer surface comprises a plurality of third grooving structures extending to a direction away from the tip-end minimal aperture, and the third grooving structures are regularly disposed along a circular direction of the optical axis.

23. The imaging lens assembly module of claim 22, wherein a number of the third grooving structures is N3, and the following condition is satisfied:

60<N3<360.

24. The imaging lens assembly module of claim 22, wherein a maximum outer diameter of the object-side outer surface is φo, and the following condition is satisfied:

1.0 mm<φo<3.5 mm.

25. The imaging lens assembly module of claim 14, wherein an opening diameter of the aperture stop is φs, a minimum opening diameter of the minimum opening among the tip-end minimal aperture of the lens barrel and the openings of the light blocking elements is φmin, and the following condition is satisfied:

0.98≤φs/φmin<1.32.

26. The imaging lens assembly module of claim 14, wherein the axial distance between the aperture stop and the first assembling surface is Ds, and the following condition is satisfied:

0.4 mm<Ds<1.0 mm.

* * * * *